(12) United States Patent
Kuroda

(10) Patent No.: US 7,328,981 B2
(45) Date of Patent: Feb. 12, 2008

(54) ELECTROSTATIC ACTUATOR, LIQUID DISCHARGE HEAD, LIQUID CARTRIDGE, IMAGING APPARATUS, MICRO PUMP, AND OPTICAL DEVICE

(75) Inventor: Takahiko Kuroda, Hyogo (JP)

(73) Assignee: Ricoh Company, Ltd., Tokyo (JP)

( * ) Notice: Subject to any disclaimer, the term of this patent is extended or adjusted under 35 U.S.C. 154(b) by 0 days.

(21) Appl. No.: 11/511,849

(22) Filed: Aug. 28, 2006

(65) Prior Publication Data

US 2007/0057999 A1    Mar. 15, 2007

(30) Foreign Application Priority Data

Sep. 14, 2005    (JP)    ............................. 2005-266265

(51) Int. Cl.
*B41J 2/05*    (2006.01)
(52) U.S. Cl. ....................................................... 347/65

(58) Field of Classification Search .................. 347/68, 347/70–72, 64–65, 54, 22, 112; 400/120.16, 400/124.14, 124.15, 124.16
See application file for complete search history.

(56) References Cited

U.S. PATENT DOCUMENTS

2005/0151797 A1*  7/2005  Sakamoto et al. ............ 347/64
2007/0176997 A1*  8/2007  Komatsu et al. ............ 347/112

FOREIGN PATENT DOCUMENTS

| JP | 11-263012 | 9/1999 |
| JP | 2001-18383 | 1/2001 |
| JP | 2003-72070 | 3/2003 |

* cited by examiner

*Primary Examiner*—K. Feggins
(74) *Attorney, Agent, or Firm*—Cooper & Dunham LLP

(57) ABSTRACT

An electrostatic actuator is disclosed that includes a deformable oscillating plate that is deformed by electrostatic force, an electrode that is arranged opposite the oscillating plate via a gap formed by sacrificial layer etching, a connection path that is connected to the gap, an atmosphere connecting hole that connects the connection path to the exterior, and a resistance path arranged between the atmosphere connecting hole and the connection path. The resistance path is configured to resist penetration of a sealing agent for sealing the atmosphere connecting hole into the connection path.

10 Claims, 35 Drawing Sheets

ELECTROSTATIC ACTUATOR, LIQUID DISCHARGE HEAD, LIQUID CARTRIDGE, IMAGING APPARATUS, MICRO PUMP, AND OPTICAL DEVICE

BACKGROUND OF THE INVENTION

1. Field of the Invention

The present invention relates to an electrostatic actuator, a liquid discharge head, a liquid cartridge, an imaging apparatus, a micro pump, and an optical device.

2. Description of the Related Art

A liquid discharge head used in an inkjet recording apparatus such as a printer, a facsimile machine, a copying machine, or a plotter, includes nozzles that discharge liquid droplets, liquid chambers that are connected to the nozzle (also referred to as discharge chamber, pressure chamber, pressurized liquid chamber, or ink flow path, for example), and actuator elements that generate energy for pressurizing the ink contained within the liquid chambers. With the generated energy, the liquid discharge head applies pressure to recording liquid contained within the liquid chamber, and induces liquid droplets to be discharged from the nozzle.

The liquid discharge head may employ a piezoelectric actuator as an electromechanical transducer, a thermal actuator that utilizes film boiling as an electrothermal transducer, or an electrostatic actuator that utilizes electrostatic force between an oscillating plate and an electrode, for example. It is noted that a liquid discharge head that employs an electrostatic actuator is particularly preferred in consideration of its possibilities with respect to miniaturization, speed increase, high densification, and energy conservation. Accordingly, attempts are currently being made to further develop such a liquid discharge head.

It is noted that the characteristics of the liquid discharge head that uses the electrostatic actuator are greatly affected by the degree of dimensional accuracy (height consistency) in the gaps formed between an oscillating plate and an electrode layer. It is particularly noted that when large-scale variations occur in the characteristics of actuators of an inkjet head (liquid discharge head), printing accuracy and image quality reproducibility may be significantly degraded. Also, the gap dimension (height) is preferably arranged to be around 0.1–0.5 μm in order to enable voltage reduction. Accordingly, higher dimensional accuracy is demanded in the inkjet head (liquid discharge head).

Japanese Laid-Open Patent Publication No. 11-263012 discloses an inkjet head that is fabricated by bonding together a substrate (cavity plate) on which pressurized liquid chambers and an oscillating plate are formed and a substrate (glass plate) on which recessed portions corresponding to gaps (oscillating chambers) and segment electrodes are formed.

In such an inkjet head that is constructed by bonding two substrates to create gaps between the oscillating plate and the electrodes, relatively large-scale dimensional variations occur with respect to the height (length) of the gaps owing to dimensional variations that are created during various processing stages including recessed portion formation, electrode formation, and bonding, for example. As a result, it is difficult to obtain an actuator with high accuracy and high reliability in this example.

Japanese Laid-Open Patent Publication No. 2001-18383 discloses an inkjet head that is fabricated by forming on a first substrate individual electrodes and an oscillating plate arranged opposite the individual electrodes via gaps formed by sacrificial layer etching; forming grooves corresponding to pressure chambers on a second substrate; and bonding the second substrate to the first substrate to thereby reduce dimensional variations in the gap height.

It is noted that in an electrostatic actuator, a connection path for interconnecting gaps and introducing air therein is provided in order to reduce the difference between the pressure within the gap and the atmospheric pressure and improve actuator reliability.

For example, Japanese Laid-Open Patent Publication No. 11-263012 discloses depositing a hydrophobic film on the internal sides of the oscillating chambers (gaps) between the oscillating plate and the electrodes by interconnecting the oscillating chambers to a connection path that is connected to the exterior of the actuator, introducing gas for forming the hydrophobic film into the oscillating chambers via the connection path, and sealing the connection path with a sealing member thereafter.

In this case, to efficiently introduce the gas for fabricating the hydrophobic film within the oscillating chambers, the cross-sectional area of the connection path is preferably arranged to be large. In this regard, for example, Japanese Laid-Open Patent Publication No. 2003-72070 discloses digging into an electrode substrate having recessed portions and electrodes formed thereon to increase the cross-sectional area of the connection path.

It is noted that Japanese Laid-Open Patent Publication No. 2001-18383 discloses use of a sacrificial layer etching process to fabricate an oscillating plate, gaps, and electrodes on one substrate, a sacrificial layer etch hole has to be sealed after the sacrificial layer etching process. For example, Japanese Laid-Open Patent Publication No. 2001-18383 discloses sealing such a hole with an insulating film made of silica dioxide. However, a CVD process, which is performed under a vacuum environment, is generally used to deposit silica dioxide, and in this case, the pressure within the gap becomes lower than the atmospheric pressure after the sacrificial etch hole is hermetically sealed. As a result, the oscillating plate may be recessed toward the electrode side. Thus, the gap has to be exposed to the atmosphere afterwards so that the deformation of the oscillating plate may be corrected. Also, as is described above, a connection path has to be provided in order to introduce gas for fabricating a hydrophobic film inside the gap.

In the case of connecting the gap to the exterior via the connection path for exposing the gap to the atmosphere or introducing material gas of the hydrophobic film, a hole connecting the connection path to the atmosphere has to be sealed with a sealing agent after the atmosphere exposure or gas introduction in order to prevent moisture or dust particles from entering the gap.

However, in the case of sealing the atmosphere connecting hole with a sealing agent, the sealing agent may penetrate into the gap via the connection path due to the capillary effect since the connection path connecting the atmosphere connecting hole to the gap is very fine. When the sealing agent penetrates into the gap as is described, normal operations may be hampered.

SUMMARY OF THE INVENTION

Embodiments of the present invention that solve one or more of the above problems include an electrostatic actuator that is configured to prevent a sealing agent from penetrating into the gap, a liquid discharge head including such an electrostatic actuator, a liquid cartridge integrating such a liquid discharge head, an imaging apparatus incorporating such a liquid discharge head or liquid cartridge, and a micro pump and an optical device employing such an electrostatic actuator.

According to one aspect of the present invention, an electrostatic actuator is provided that includes:

a deformable oscillating plate that is deformed by electrostatic force;

an electrode that is arranged opposite the oscillating plate via a gap formed by sacrificial layer etching;

a connection path that is connected to the gap;

an atmosphere connecting hole that connects the connection path to the exterior; and a resistance path arranged between the atmosphere connecting hole and the connection path, the resistance path being configured to resist penetration of a sealing agent for sealing the atmosphere connecting hole into the connection path.

In a preferred embodiment, the connection path is a common connection path that is connected to plural gaps. In another preferred embodiment, plural atmosphere connecting holes are provided. In another preferred embodiment, the sealing agent for sealing the atmosphere connecting hole is different from a sealing agent for sealing a sacrificial layer removal hole that is used to perform sacrificial layer etching. In another preferred embodiment, the gap, the connection path, and the resistance path are formed by removing the same sacrificial layer.

In another preferred embodiment, the resistance path is a wobbled path, a path having high level portions and low level portions, and/or a path having portions with a relatively small cross-sectional area and portions with a relatively large cross-sectional area.

According to another aspect of the present invention, a liquid discharge head is provided that includes an electrostatic actuator according to an embodiment of the present invention.

According to another aspect of the present invention, a liquid cartridge is provided that includes a liquid discharge head according to an embodiment of the present invention that is integrated with a liquid tank that supplies liquid to the liquid discharge head.

According to another aspect of the present invention, an imaging apparatus is provided that includes a liquid discharge head or a liquid cartridge according to an embodiment of the present invention that is used to discharge droplets of liquid.

According to another aspect of the present invention, a micro pump is provided that includes an electrostatic actuator according to an embodiment of the present invention that is used to transfer liquid.

According to another aspect of the present invention, an optical device is provided that includes an electrostatic actuator according to an embodiment of the present invention that is used to change the reflecting direction of light.

DESCRIPTION OF THE PREFERRED EMBODIMENTS

In the following, preferred embodiments of the present invention are described with reference to the accompanying drawings.

Figure 1:
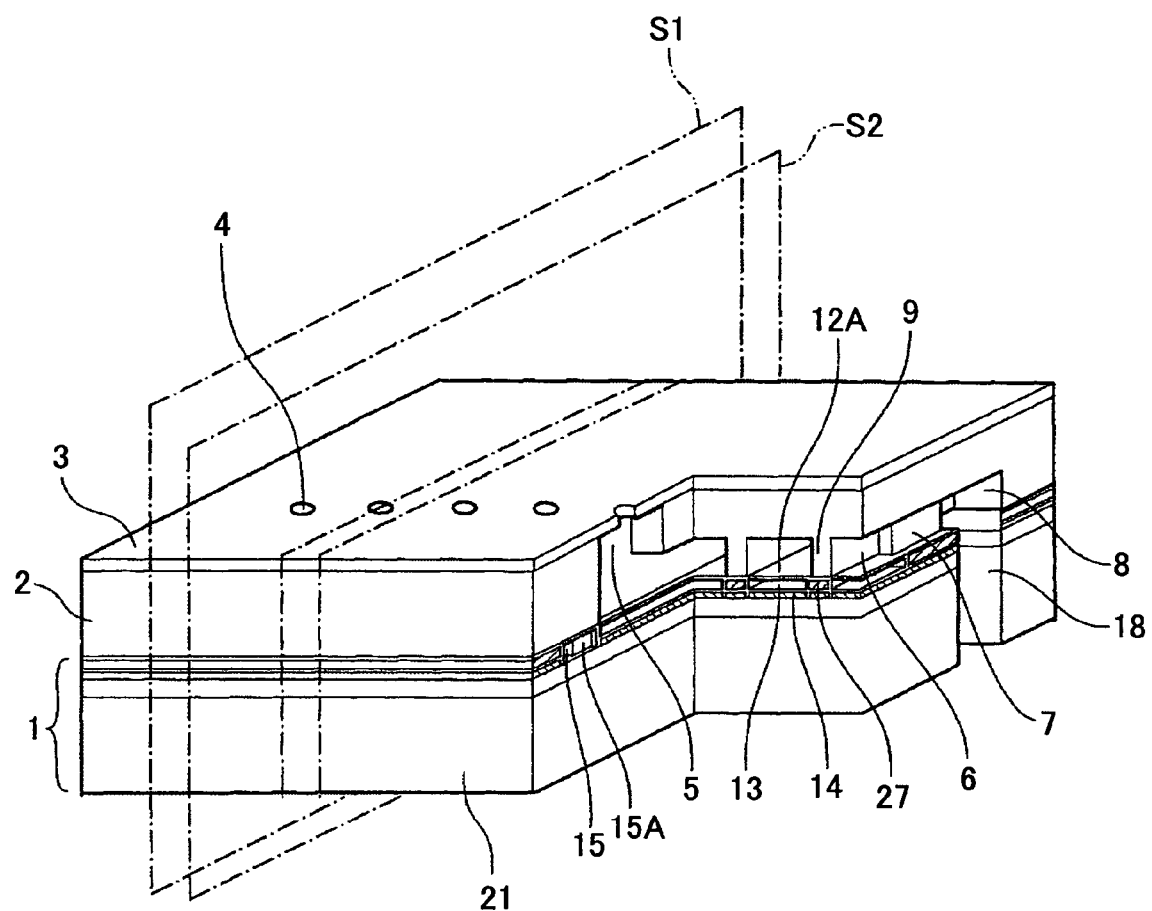
FIG. 1 is a perspective view of a liquid discharge head that includes an electrostatic actuator according to a first embodiment of the present invention.
Figure 2:
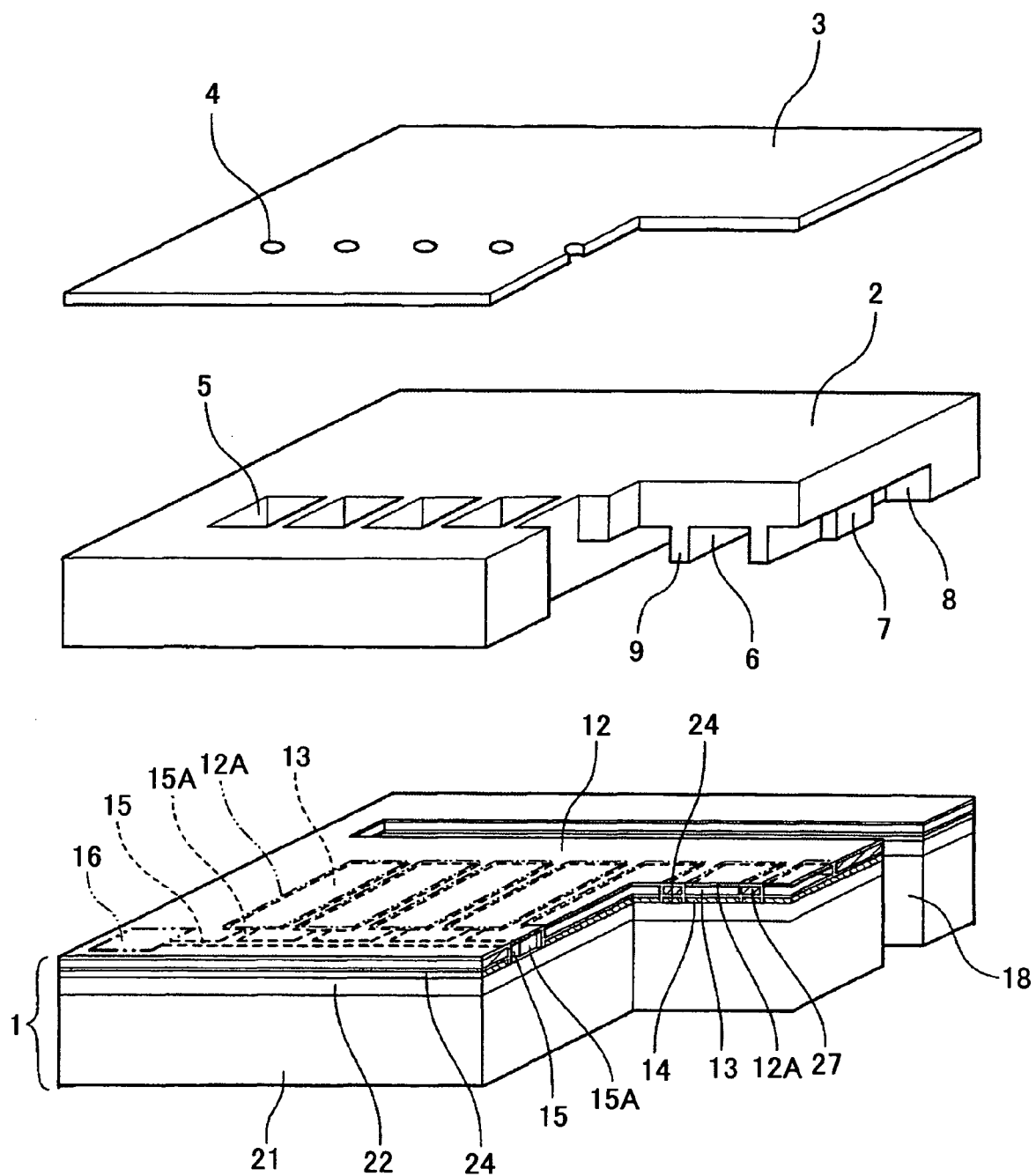
FIG. 2 is an exploded perspective view of the liquid discharge head of FIG. 1.
Figure 3:
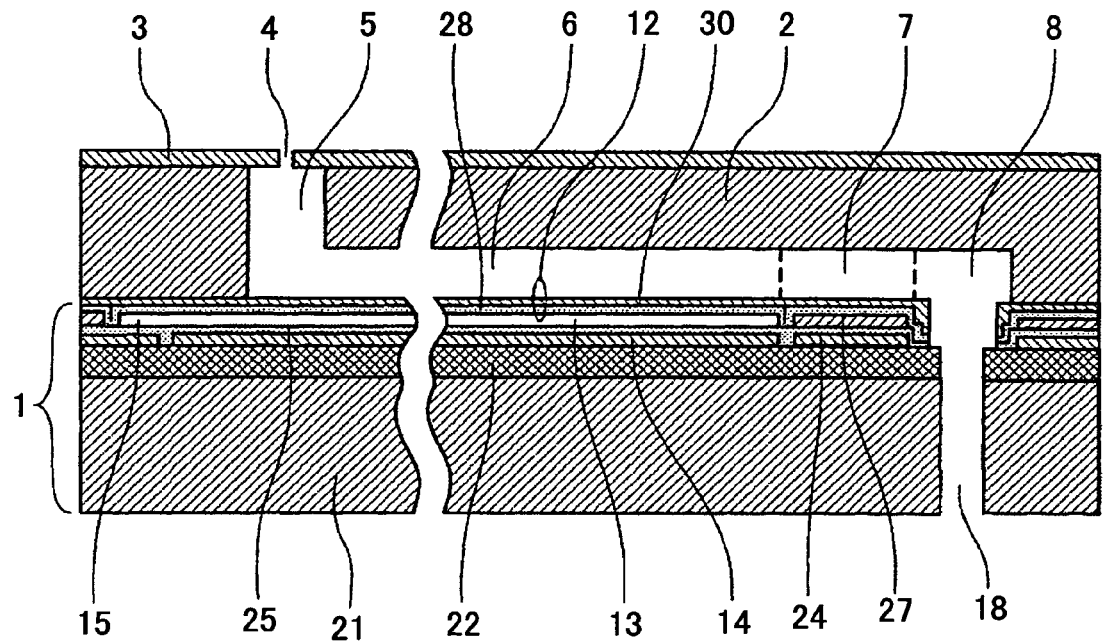
FIG. 3 is a cross-sectional diagram showing a cross section of the liquid discharge head of FIG. 1.
Figure 4:
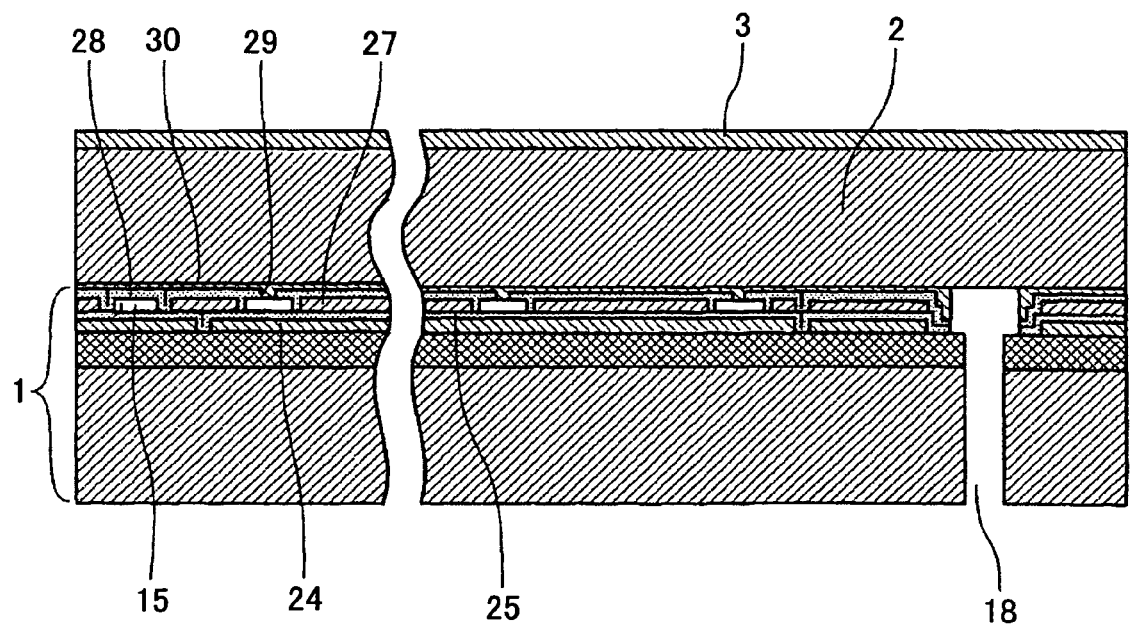
FIG. 4 is a cross-sectional diagram showing another cross section of the liquid discharge head of FIG. 1.

FIG. 1 is a perspective view of an inkjet head as a liquid discharge head including an electrostatic actuator according to a first embodiment of the present invention. FIG. 2 is an exploded perspective view of the inkjet head of FIG. 1. FIG. 3 is a cross-sectional diagram showing a cross section S1 cut along a liquid chamber long side direction of the inkjet head of FIG. 1. FIG. 4 is a cross-sectional diagram showing another cross section S2 cut along the liquid chamber long side direction of the inkjet head of FIG. 1.

The illustrated inkjet head is a side-shooting inkjet head that shoots liquid droplets from nozzles arranged on the face of a substrate. The inkjet head includes an actuator substrate 1 as a first substrate, a flow path substrate 2 as a second substrate, and a nozzle substrate 3 as a third substrate. The three substrates 1-3 are bonded together to form liquid chambers (discharge chambers) 6 that are connected to nozzles 4 via nozzle connection paths 5, fluid resistance parts 7, and a common liquid chamber 8 for supplying liquid (ink) to the liquid chambers 6. It is noted that the liquid chambers 6 are partitioned by liquid chamber partition walls 9.

The actuator substrate 1 includes an oscillating plate 12 on which oscillating plate areas 12A (deformable areas) are formed, and individual electrodes 14 that are arranged opposite the oscillating plate areas 12A via gaps 13 that are formed by sacrificial layer etching. It is noted that the oscillating plate 12 and the individual electrodes 14 may comprise electrostatic actuators for the liquid chambers 6.

The actuator substrate 1 also includes a common connection path (connection tube) 15 that interconnects the gaps 13 and is connected to the exterior of the actuator substrate 1. The common communication path 15 is connected to the gaps 13 via individual connection paths 15A at one end, and is connected to an atmosphere connecting part 16 for connecting the common connection path 15 to the atmosphere at the other end. It is noted that the atmosphere connecting part 16 is sealed by a sealing agent at the time the actuator substrate 1 is fabricated.

The actuator substrate 1 is fabricated by depositing an insulating film 22 on a silicon substrate 21; depositing an electrode forming layer 24, which is etched to form the individual electrodes 14, on the insulating film 22; depositing an insulating film 25 on the electrode forming layer 24; depositing a sacrificial layer 27 for creating the gaps 13, the common connection path 15, the individual connection paths 15A, and an atmosphere connecting gap 41 (see FIG. 8) of the atmosphere connecting part 16 on the insulating film 25; depositing an insulating film 28 on the sacrificial layer 27; creating sacrificial layer removal holes 29 in the insulating film 28; removing the sacrificial layer 27 from the sacrificial layer removal holes 29 to create the gaps 13, the common connection path 15, the individual connection paths 15A, and the atmosphere connecting gap 41 of the atmosphere connection part 16; and depositing an oscillating plate member 30 on the insulating film 28.

It is noted that the insulating film 22 is arranged on the individual electrodes 14 to prevent short circuiting with the oscillating plate 12 and protect the individual electrodes 14 during the sacrificial etching process for creating the gaps 13. The insulating layer 28 is arranged on the oscillating plate 12 to prevent short circuiting with the individual electrodes 14 and protect portions of the oscillating plate member 30 on the insulating film 28 during the sacrificial etching process for creating the gaps 13.

Also, it is noted that the actuator substrate 1 includes a supply opening 18 for supplying ink from the exterior to the common liquid chamber 8 of the flow path substrate 2.

The flow path substrate 2 that is bonded to the actuator substrate 1 may include a (110) crystal orientation silicon substrate having the liquid chambers 6 and the common liquid chamber 8 connected to the liquid chambers 6 via the fluid resistance parts 7 arranged thereon, for example.

The nozzle substrate 3 that is bonded to the flow path substrate 2 may be fabricated using a nickel layer with a thickness of 50 μm, and creating the nozzles 4 through conventional methods such as dry or wet etching and laser processing, for example.

In the inkjet head that is fabricated by bonding together the substrates 1-3 as is described above, when the liquid chambers 6 are adequately filled with recording liquid (ink), an oscillating circuit (not shown) may apply a 40 V pulse voltage to an individual electrode 14 corresponding to a nozzle 4 from which recording liquid is to be discharged according to image data from a control unit (not shown). By applying such a voltage, the surface of the individual electrode 14 may be charged by a positive charge, and an electrostatic force may be generated between the individual electrode 14 and the oscillating plate 12 that includes an oscillating electrode so that the oscillating plate 12 sags downward by attraction from the electrostatic force. In this way, the volume capacity of the liquid chamber 6 increases, and an amount of recording liquid corresponding to the volume increase of the liquid chamber 6 flows from the common liquid chamber 10 into the liquid chamber 6 via the fluid resistance part 7.

Then, the pulse voltage applied to the individual electrode 14 is switched to 0 V (i.e., voltage application is stopped) so that the oscillating plate 12 that has been sagging downward from the electrostatic force returns to its original position owing to its elastic property. As a result, the pressure within the liquid chamber 6 suddenly increases so that droplets of recording liquid are discharged from the nozzle 4 connected to this liquid chamber 6. Thus, an image may be formed on a recording medium (e.g., paper sheet) that is placed opposite the liquid discharge head by repeating the above-described operations to successively discharge recording liquid droplets from the nozzle 4.

It is noted that the electrostatic force acting between the individual electrode 14 and the oscillating plate 12 within the electrostatic actuator may be expressed by the following formula (1):

$$F = \frac{1}{2} \cdot \frac{\varepsilon S}{d^2} V^2 \quad (1)$$

(F: electrostatic force acting between electrodes; ε: dielectric constant; S: area of opposing face of electrodes; d: distance between electrodes; V: applied voltage)

According to the above formula (1), the electrostatic force F is inversely proportional to the square of the distance d between the electrodes, and is proportional to the square of the applied voltage V. In other words, in order to reduce the drive voltage of an electrostatic actuator or a liquid discharge head employing the electrostatic actuator, the distance between the individual electrodes 14 and the oscillating plate 12 (i.e., gap length) has to be reduced.

In this respect, by forming the gaps 13 through sacrificial etching, the gaps 14 may be finely and precisely formed at stable intervals with little variations so that electrostatic actuators with little operational characteristic variation may be fabricated. Also, by employing such electrostatic actuators in a liquid discharge head, variations in discharge characteristics between nozzles of the liquid discharge head may be reduced and a high quality image may be formed.

Figure 5:
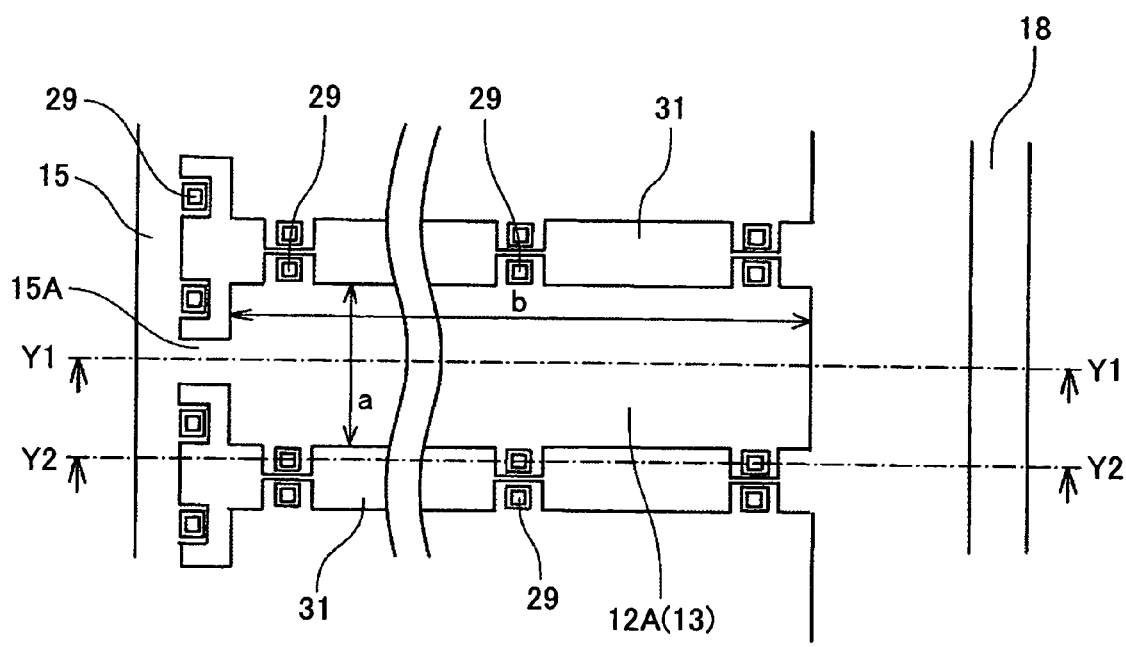
FIG. 5 is a plan view of a portion of an actuator substrate of the electrostatic actuator according to the first embodiment.
Figure 6:
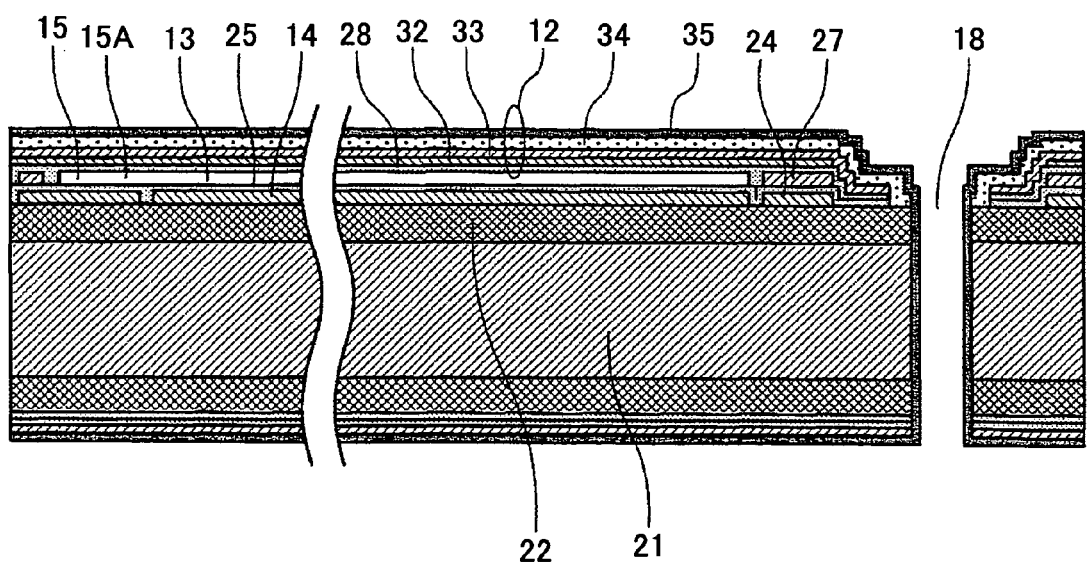
FIG. 6 is a cross-sectional diagram showing a cross section of the actuator substrate portion of FIG. 5 cut across line Y1-Y1.
Figure 7:
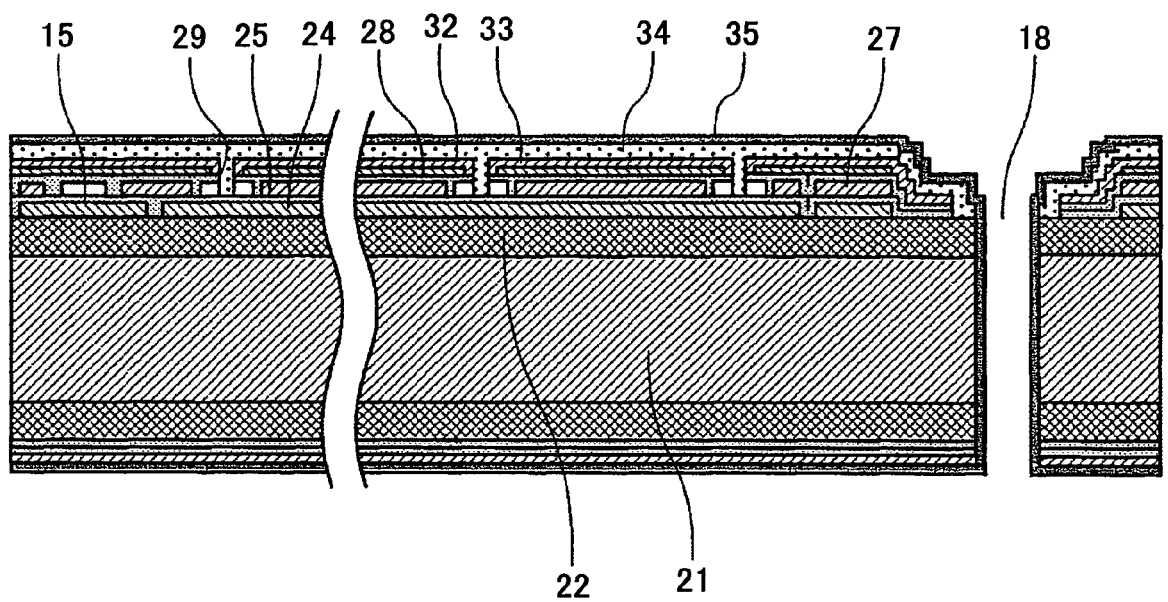
FIG. 7 is a cross-sectional diagram showing a cross section of the actuator substrate portion of FIG. 5 cut across line Y2-Y2.
Figure 8:
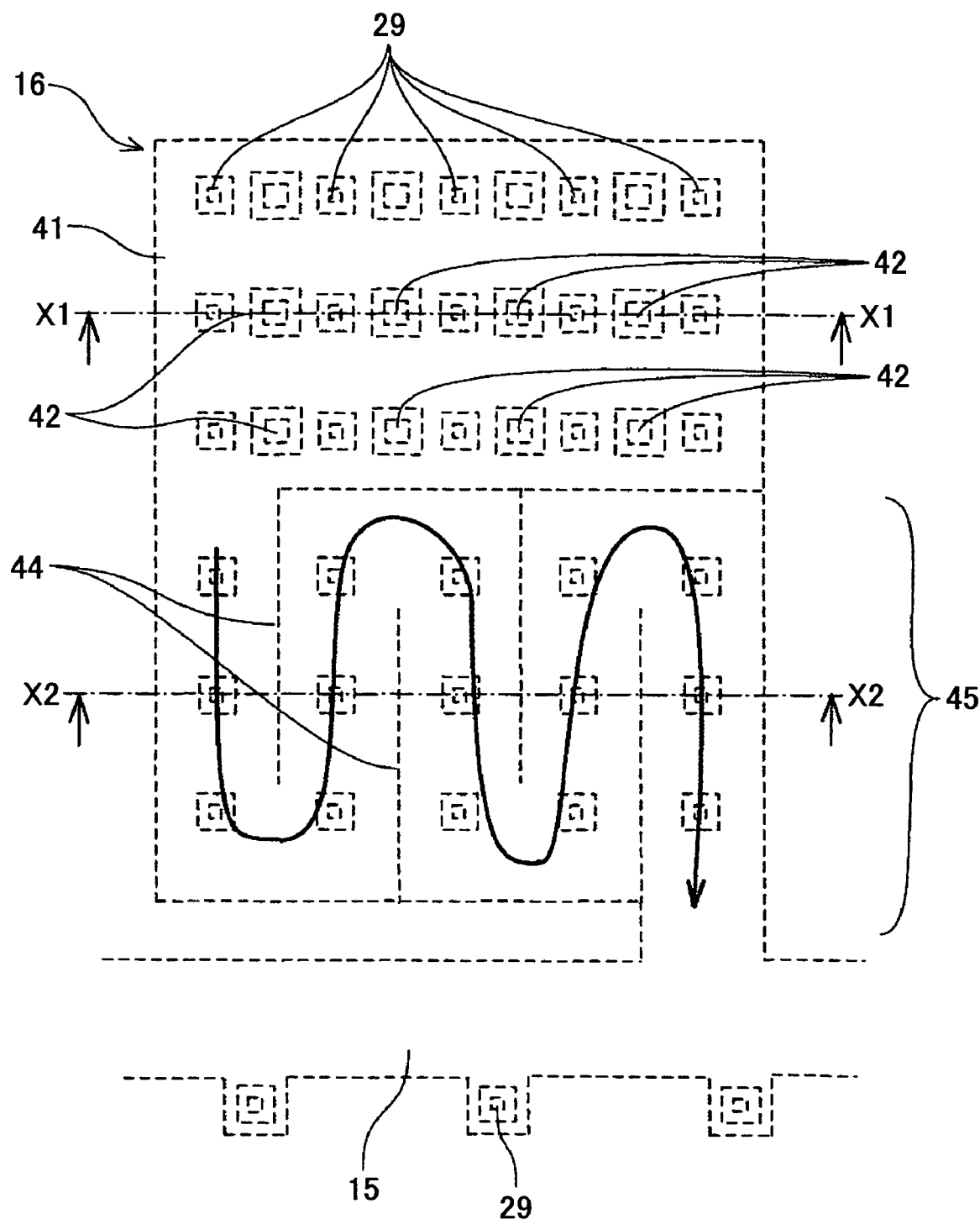
FIG. 8 is a plan view of a portion of the actuator substrate according to the first embodiment corresponding to where an atmosphere connecting part is formed.
Figure 9:
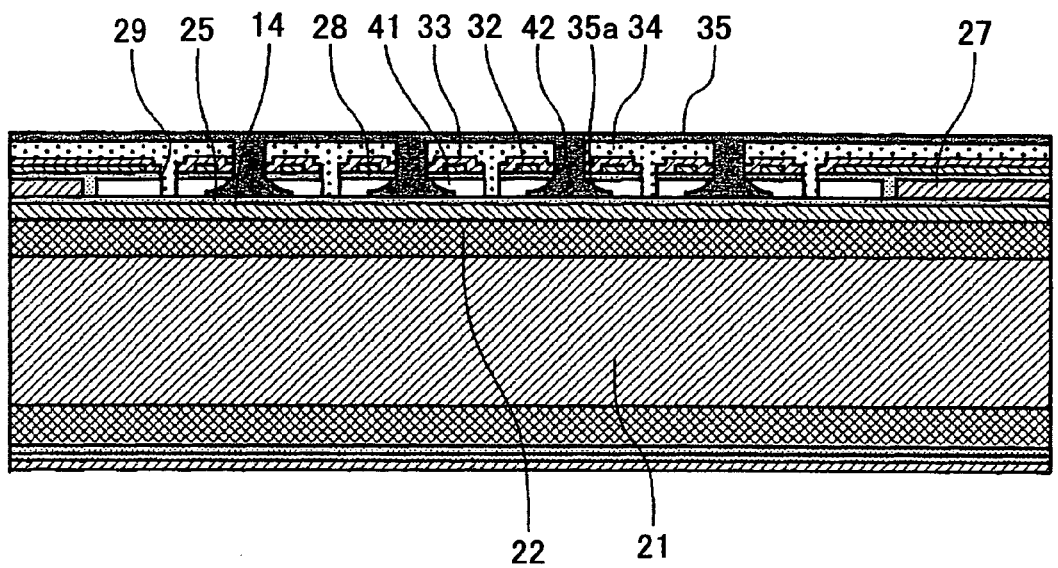
FIG. 9 is a cross-sectional diagram showing a cross section of the actuator substrate portion of FIG. 8 cut across line X1-X1.
Figure 10:
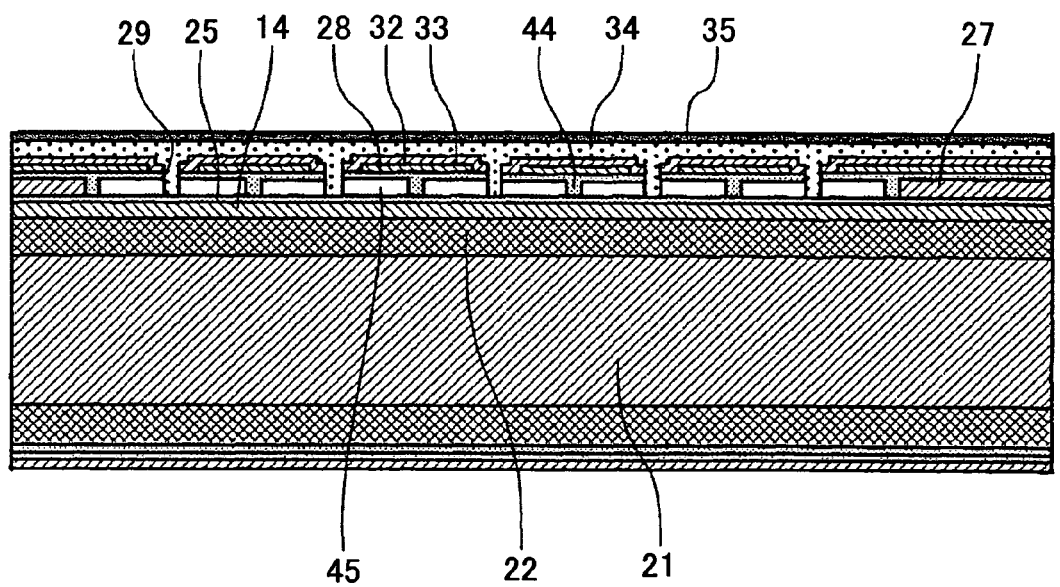
FIG. 10 is a cross-sectional diagram showing a cross section of the actuator substrate portion of FIG. 8 cut across line X2-X2.

In the following, the actuator substrate 1 is described in detail with reference to FIGS. 5 through 10. FIG. 5 is a plan view of the actuator substrate 1, FIG. 6 is a cross-sectional diagram showing a cross section of the actuator substrate 1 cut across line Y1-Y1 of FIG. 5, FIG. 7 is a cross-sectional diagram showing a cross section of the actuator substrate 1 cut across line Y2-Y2 of FIG. 5, FIG. 8 is a plan view of a portion of the actuator substrate 1 corresponding to where the atmosphere connecting part 16 is formed, FIG. 9 is a cross-sectional diagram showing a cross section of the actuator substrate portion of FIG. 8 cut across line X1-X1, and FIG. 10 is a cross-sectional diagram showing a cross-section of the actuator substrate portion of FIG. 8 cut across line X2-X2.

The oscillating plate 12 of the actuator substrate 1 is made up of the insulating film 28 and the oscillating plate member 30 as is described above. The oscillating plate member 30 is fabricated by successively depositing an oscillating plate electrode (upper electrode) 32, a sagging prevention film (nitride film) 33, a film rigidity adjusting film 34, and a resin film 35 on the insulating film 28.

As is shown in FIG. 5, the oscillating plate 12 includes deformable oscillating plate areas 12A that are divided by partition walls 31 that are arranged opposite the partition walls 9 partitioning the liquid chambers 6. In one example, dimensions of the short side (a) and the long side (b) of the oscillating plate area 12A may be 60 μm and 100 μm, respectively.

As is described above, the individual electrodes 14 are created from the electrode forming layer 24 that is arranged on the insulating film 22, which in turn is arranged on the surface of the silicon substrate 21. The individual electrodes 14 are arranged opposite the oscillating plate areas 12A, and the insulating film 25 is arranged on the surface of the individual electrodes 14.

The gaps 13 between the oscillating plate areas 12A and the individual electrodes 14 are created by sacrificial layer etching. The sacrificial layer etching process involves forming the sacrificial layer 27 having a thickness corresponding to the height of the gaps 13 on the insulating film 25; successively depositing the insulating film 28, the oscillating plate electrode 32, and the sagging prevention film (nitride film) 33; creating the sacrificial layer removal holes 29 that penetrate through these layers; and removing portions of the sacrificial layer 27 corresponding to the gaps 13 via the sacrificial layer removal holes 29.

It is noted that the common connection path 15, the individual connection paths 15A, and the atmosphere connecting gap 41 of the atmosphere connecting part 16 are formed along with the gaps 13 in the sacrificial etching process for removing the sacrificial layer 27. By removing the same sacrificial layer 27 to simultaneously form the oscillation plate-electrode gaps 13, the common connection path 15, the individual connection paths 15A, and the connecting gap 41 of the atmosphere connecting part 16, the gaps 13 and connection paths 15, 15A formed in the sacrificial layer etching process may be interconnected, their structures may be simplified, fabrication steps may be reduced, and the productivity and production yield may be improved, for example.

As is shown in FIG. 5, the sacrificial layer removal holes 29 are equidistantly arranged along the long sides of the oscillating plate area 12A at space intervals less than the short side dimension (a) of the oscillating plate area 12A, and the sacrificial layer removal holes 29 at opposing sides of the oscillating plate area 12A are arranged at the same positions with respect to the long side direction. It is noted that since the sacrificial layer etching process is an isotropic etching process, the sacrificial layer removing efficiency may be improved when the sacrificial layer removal holes 29 are arranged at the center of the oscillating plate areas 12A. However, when the sacrificial layer removal holes 29 are arranged on the oscillating plate areas 12A, the sacrificial layer removal holes 29 may affect the oscillation characteristics of the actuator. Therefore, the sacrificial layer removal holes 12A are preferably arranged at the outer side of the oscillating plate areas 12A. Also, it is noted that by arranging plural sacrificial layer removal holes 29, the sacrificial layer 27 may be efficiently removed and the gaps 13 may be created in an efficient manner.

It is noted that since the area ratio of the atmosphere connecting part 16 with respect to the oscillating plate areas 12A is relatively small, the sacrificial layer removal holes 29 for forming the atmosphere connecting gap 41 of the atmosphere connecting part 16 may be formed within the atmosphere connecting part 16 in order to achieve higher efficiency in etching the sacrificial layer 27 as is shown in FIG. 8.

After sacrificial layer etching, the sacrificial layer removal holes 29 are sealed with the film rigidity adjusting film 34. Then, a wiring layer (not shown) from which external electrodes are extended and the supply opening 18 for supplying recording liquid to the common liquid chamber 8 are formed. Also, atmosphere connecting holes 42 that are connected to the atmosphere connecting gap 41 of the atmosphere connecting part 16 are created. Thus, the gaps 13 may be exposed to the atmosphere via the atmosphere connecting holes 42, the atmosphere connecting gap 41, the common connection path 15, and the individual connection paths 15A, or gas material such as hexamethyl-disilazane (HMDS) for forming the hydrophobic film may be introduced into the gaps 13.

In this case, the atmosphere connecting holes 42 of the atmosphere connecting part 16 may be formed through litho-etching that enables fine processing. In this way, compared to a case of performing laser etching or physical processing, the atmosphere exposure area may be reduced, particle generation may be reduced, and a flat surface may be maintained so that a next process may not be significantly affected by the current process.

Then, the resin film 35 as a liquid contacting film may be formed through spray coating or vapor deposition polymerization. In this process, the atmosphere connecting holes 42 formed through litho-etching are sealed by the resin film 35.

As described in detail below, a wobbled path 45 as a resistance path for preventing a sealing agent 35a for sealing the atmosphere connecting holes 42 (e.g., resin material of the resin film 35) from entering the common connection path 15 is arranged at the atmosphere connecting gap 41 between the atmosphere connecting holes 42 and the common connection path 15. In this way, the resin (sealing agent 35a) for forming the resin film 35 may be prevented from entering the common connection path 15.

Specifically, partitioning walls 44 are arranged at a portion of the atmosphere connecting gap 41 of the atmosphere connecting part 16 leading to the common connection path 15 (e.g., the partitioning walls may be formed by the insulating film 28). In this way, the wobbled path 45 as is illustrated by the arrow shown in FIG. 8 may be formed. It is noted that the sealing agent 35a (see FIG. 9) for forming the resin film 35 that enters the atmosphere connecting gap 41 from the atmosphere connecting openings 42 may enter the wobbled path 45 due to the capillary effect; however, the wobbled path 45 may have increased resistance against penetration of the sealing agent 35a owing to its wobbled path structure compared to a linear path. Therefore, the sealing agent 35a may be trapped within the wobbled path 45 to be prevented from reaching the common connection path 15. In this way, the sealing agent 35a may be prevented from entering the gaps 13 to obstruct deformation of the oscillating plate 12 and cause operational defects, for example.

According to test results, when resin enters the common connection path 15, the resin may easily penetrate into the gaps 13 via the individual connection paths 15A as a result of the capillary effect. Thus, the cross-sectional area and length of the wobbled path 45 and/or the number of turns within the wobbled path 45 are preferably arranged such that adequate resistance may be secured to prevent the sealing agent 35a entering the atmosphere connecting holes 42 from reaching the common connection path 15.

As can be appreciated from the above descriptions, by providing a connection path (e.g., common connection path 15 and individual connection paths 15A) that is connected to gaps (e.g., gaps 13) and atmosphere connecting holes (e.g., atmosphere connecting holes 42), and connecting the atmosphere connecting holes and the connection path via a fluid path (e.g., atmosphere connecting gap 41) that includes a resistance element (e.g., wobbled path 45) that prevents a sealing agent for sealing the atmosphere connecting holes from penetrating into the connection path, the sealing agent may be prevented from penetrating into the gaps of the actuator via the connection path due to the capillary effect in the process of sealing the atmosphere connecting holes. In this way, an electrostatic actuator with reduced operational defects and improved production yield may be provided.

In the following, a method for manufacturing the actuator substrate according to the first embodiment is described with reference to FIGS. 11A through 18C. It is noted that FIGS. 11A through 12C are cross-sectional views of the actuator substrate cut across line Y1-Y1 of FIG. 5; FIGS. 13A through 14C are cross-sectional views of the actuator substrate cut across line Y2-Y2 of FIG. 5; FIGS. 15A through 16C are cross-sectional views of the actuator substrate cut across line X1-X1 of FIG. 8; and FIGS. 17A through 18C are cross-sectional views of the actuator substrate cut across line X2-X2 of FIG. 8.

Referring to FIGS. 11A, 13A, 15A, and 17A, an insulating film (thermal oxide film) 22 with a thickness of 1.6 µm is arranged on the face (on both the upper and lower faces in the illustrated example) of a silicon (Si) substrate 21 having a thickness of 400 µm, for example. Then, P-doped poly-silicon is deposited on the insulating film 22 at a film thickness of 0.3 µm as the electrode forming layer 24 for forming the individual electrodes 14. Then, litho-etching is performed on the polysilicon (electrode forming layer 24) to form dividing grooves 50. In this process, the polysilicon is patterned to form the individual electrodes 14 and portions 51 corresponding to partitioning walls, and the polysilicon is removed to form portions 53 at which the silicon substrate 21 is later perforated to form the supply opening 18. Then, a CVD oxide film is deposited at a film thickness of 0.1 μm so that the polysilicon pattern of the individual electrodes 14, the portions 51 corresponding to the partitioning walls, and the dividing grooves 50 are covered by the insulating film 25.

Figure 11A:
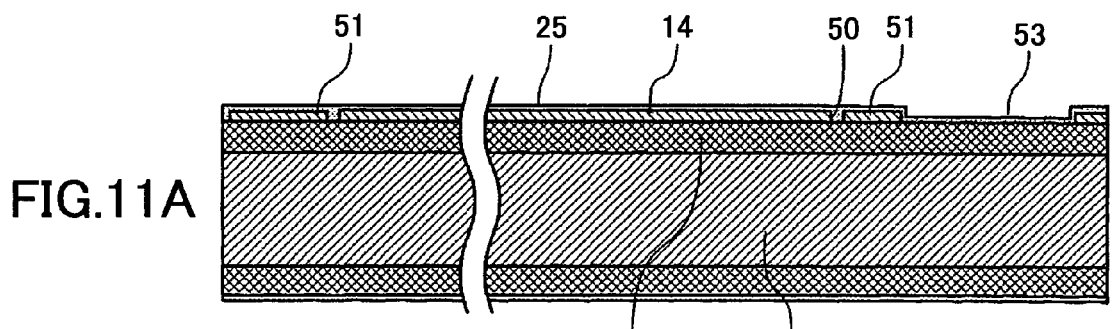
FIGS. 11A-11D are cross-sectional diagrams corresponding to cross sections cut across line Y1-Y1 of FIG. 5 that illustrate process steps for manufacturing the actuator substrate of the first embodiment.
Figure 11B:
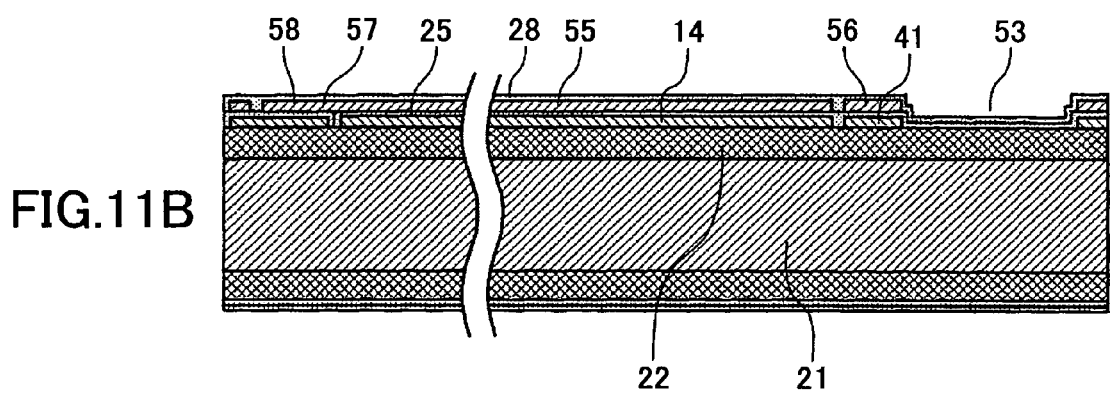
Figure 13A:
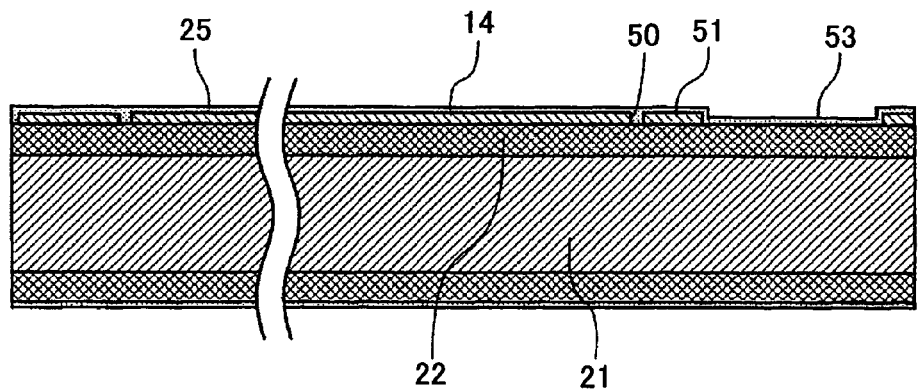
FIGS. 13A-13D are cross-sectional diagrams corresponding to cross sections cut across line Y2-Y2 of FIG. 5 that illustrate process steps for manufacturing the actuator substrate of the first embodiment.
Figure 13B:
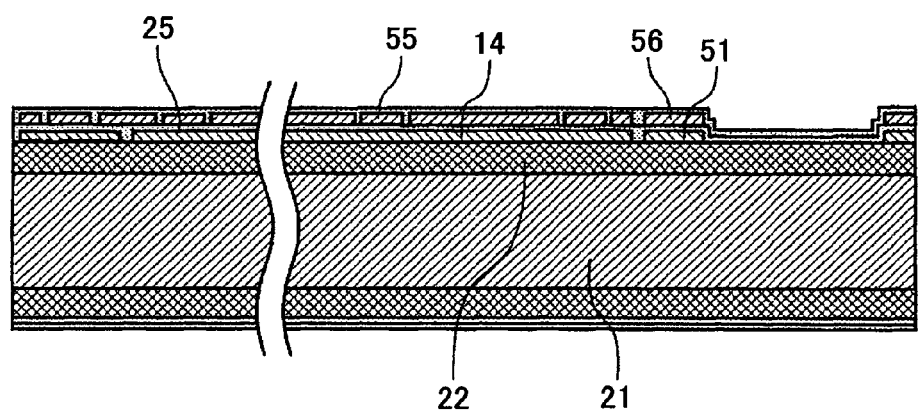

Then, as is shown in FIGS. 11B and 13B, using the CVD method, non-doped polysilicon as the sacrificial layer 27 (see FIG. 10) is deposited on the insulating film 25 by the CVD method at a film thickness of 0.2 μm corresponding to the height of the gaps 13. Then, litho-etching is performed on the polysilicon to pattern and divide the polysilicon into portions 55 corresponding to the gaps 13, portions 56 corresponding to the partitioning walls, portions 57 corresponding to the individual connection paths 15A, portions 58 corresponding to the common connection path 15, and the polysilicon is removed from portions corresponding to the portions 53 where the supply opening 18 is to be formed.

Figure 15A:
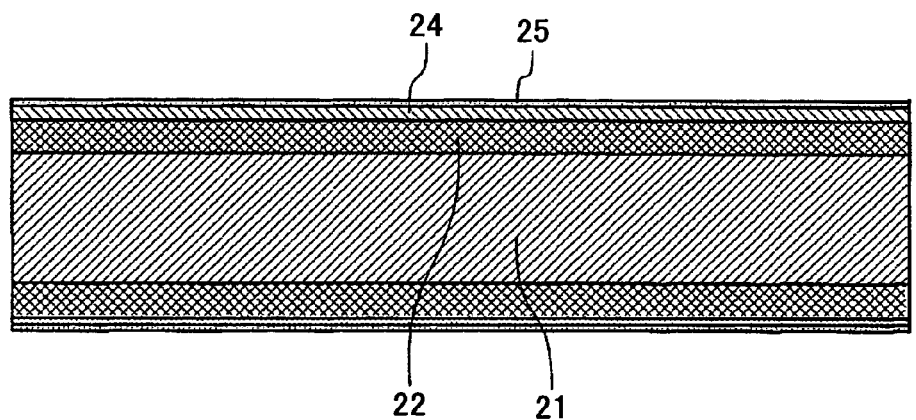
FIGS. 15A-15D are cross-sectional diagrams corresponding to cross sections cut across line X1-X1 of FIG. 8 that illustrate process steps for manufacturing the actuator substrate of the first embodiment.
Figure 15B:
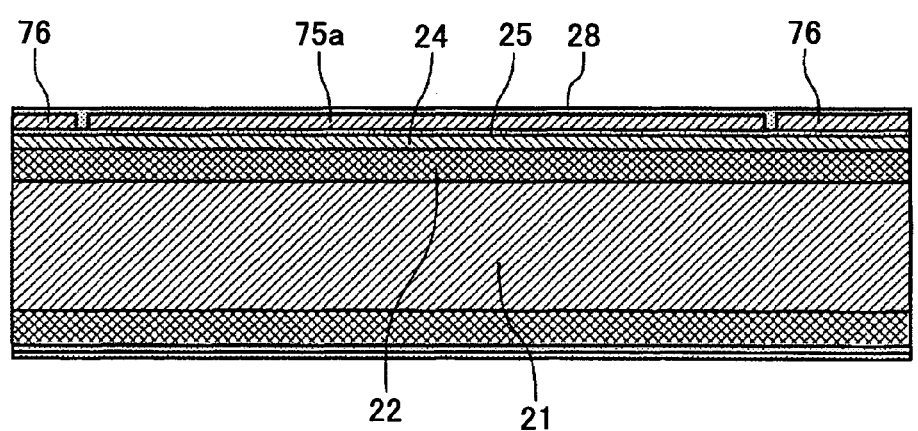
Figure 17A:
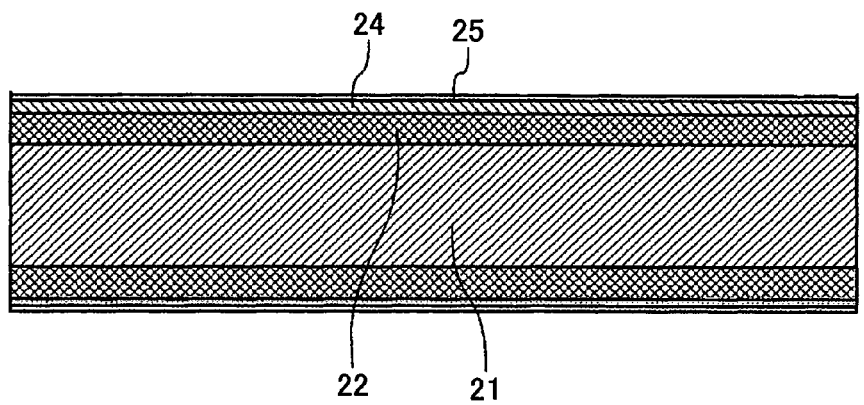
FIGS. 17A-17D are cross-sectional diagrams corresponding to cross sections cut across line X2-X2 of FIG. 8 that illustrate process steps for manufacturing the actuator substrate of the first embodiment.
Figure 17B:
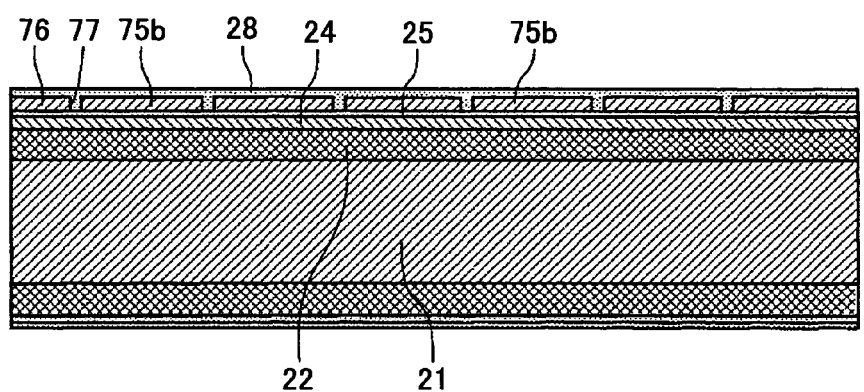

In this case, as is shown in FIGS. 15B and 17B, at the portion corresponding to where the atmosphere connecting part 16 is to be formed, polysilicon for forming the sacrificial layer 27 is arranged on the insulating film 25, and litho-etching is performed on the polysilicon to pattern and divide the polysilicon into a portion 75a corresponding to the atmosphere connecting gap 41, portions 75b corresponding to the wobbled path 45, and portions 76 corresponding to the partitioning walls. In this way, the partitioning walls 44 and grooves 77 are created.

As can be appreciated from the above descriptions, by using polysilicon as the material of the sacrificial layer 27, a conventional technique may be used to remove the sacrificial layer 27, material combination options may be enhanced, and processing flexibility may be increased so that an actuator may be stably produced at low cost with high productivity.

Then, a CVD oxide film as the insulating film 28 is deposited at a film thickness of 0.1 μm on the sacrificial layer 27 pattern including the portions 55 corresponding to the gaps 13, the portions 56 corresponding to the partitioning walls, and the portions 57/58 corresponding to the individual/common connection paths 15A/15, and the sacrificial layer 27 pattern including the portion 75a corresponding to the atmosphere connecting gap 41, the portions 75b corresponding to the wobbled path 45, and the portions 76 corresponding to the partitioning walls. It is noted that in this case, as is shown in FIG. 17B, the insulating film 28 is also arranged within the grooves 77 so that the partitioning walls 44 may be formed (see FIG. 17D).

Figure 11C:
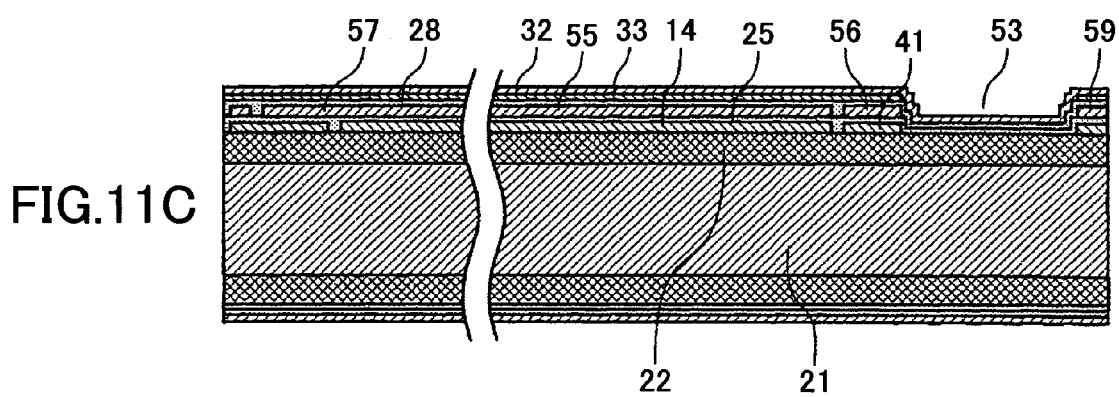
Figure 13C:
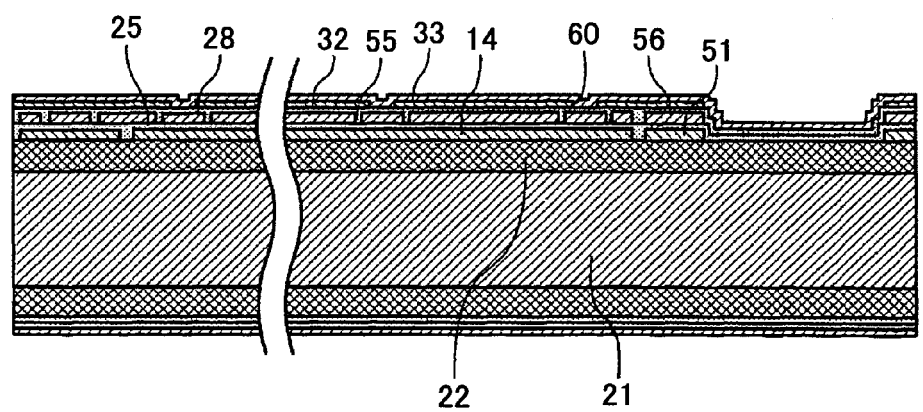

Then, as is shown in FIGS. 11C and 13C, a P-doped polysilicon layer for forming the oscillating plate electrode film 32 is formed at a film thickness of 0.1 μm on the insulating film 28. Litho-etching is performed on this polysilicon layer to divide the layer into the oscillating plate electrode film 32 and portions 59 forming partitioning walls, and the polysilicon is removed from portions 53 where the supply opening 18 is to be formed.

In this etching process, openings 60 are formed on the polysilicon layer. The openings 60 have a greater diameter than the sacrificial layer removal holes 29 (to be formed later) so that the oscillating plate electrode layer 32, which is made of the same material as that of the sacrificial layer 27, may be prevented from being etched along with the sacrificial layer 27 in the sacrificial layer etching process. Then, a nitride film with a thickness of 0.15 μm is deposited through a LP-CVD process to form the sagging prevention films 33 for the oscillating plates 12 on the oscillating plate electrode layer 32. The sagging prevention layers 33 made of the nitride film are also arranged within the openings 60 to cover the edges of the openings 60 of the oscillating plate electrode layer 32.

Figure 15C:
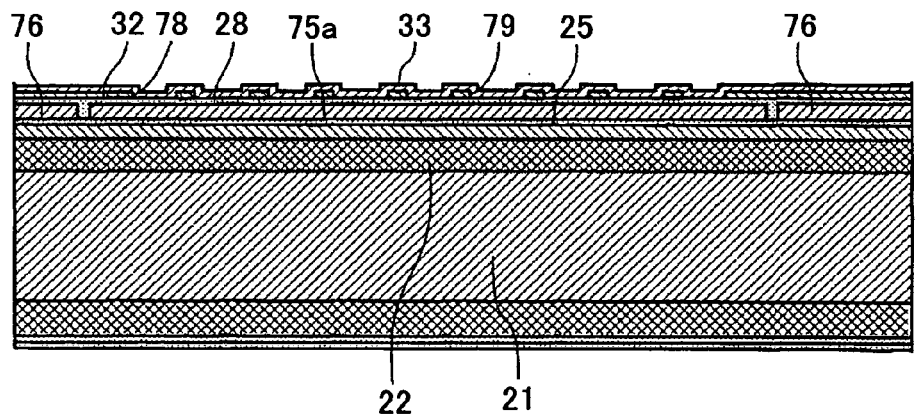
Figure 17C:
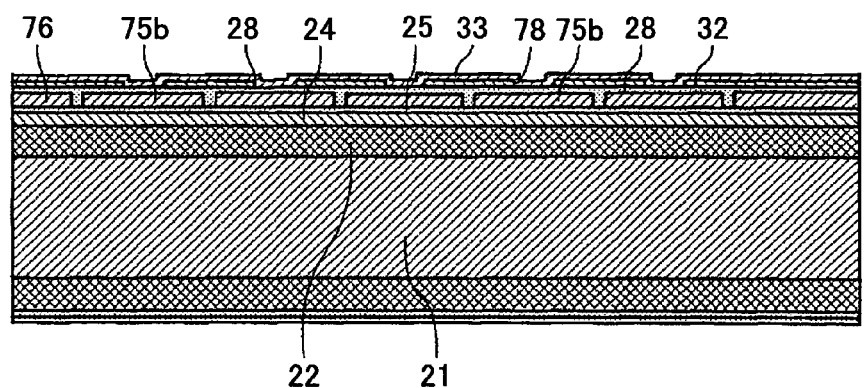

Also, as is shown in FIGS. 15C and 17C, at the portion where the atmosphere connection part 16 is to be formed, the polysilicon layer for forming the oscillating plate electrode layer 32 is patterned and divided through litho-etching to form openings 78 having a diameter that is greater than that of the sacrificial layer removal holes 29 and openings 79 having a diameter that is greater than that of the atmosphere connecting holes 42. Then, a nitride film corresponding to the sagging prevention film 33 is arranged over the patterned polysilicon layer including the areas within the openings 78 and 79.

Figure 11D:
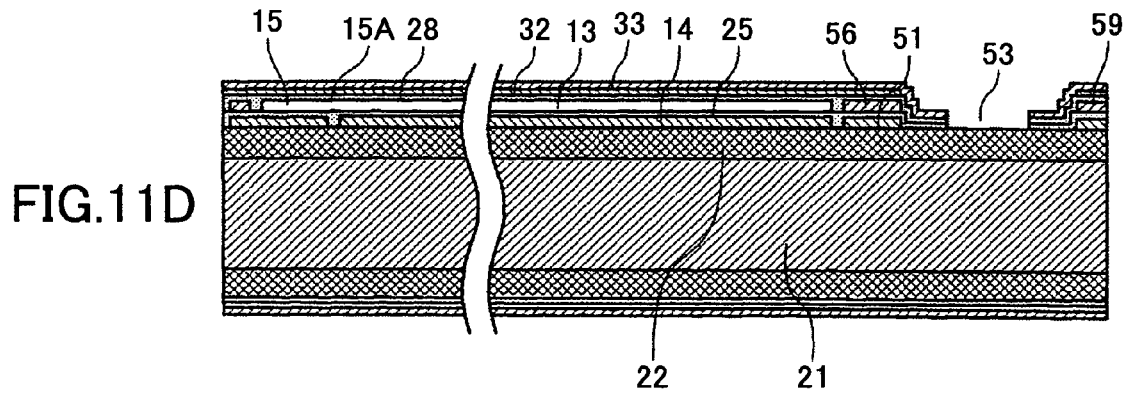
Figure 12A:
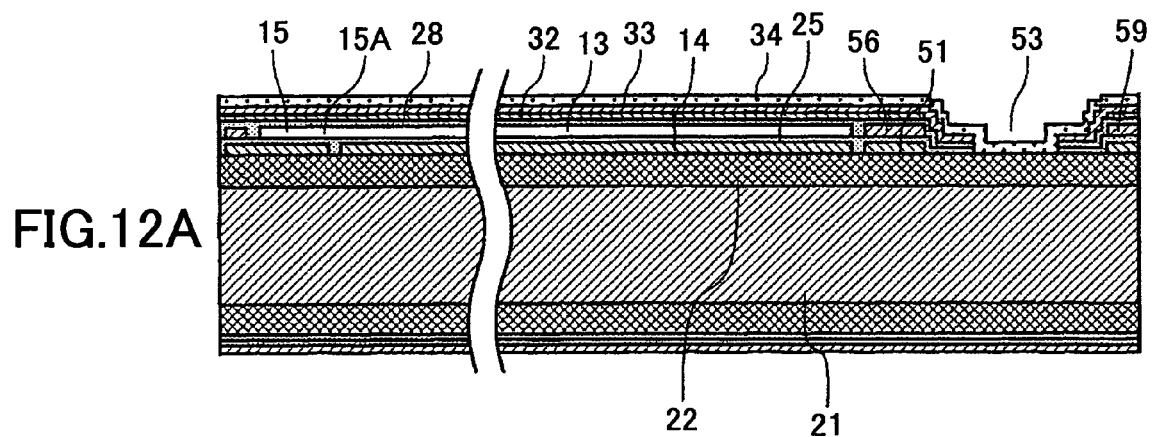
FIGS. 12A-12C are cross-sectional diagrams illustrating the process steps for manufacturing the actuator substrate continued from FIGS. 11A-11D.
Figure 12B:
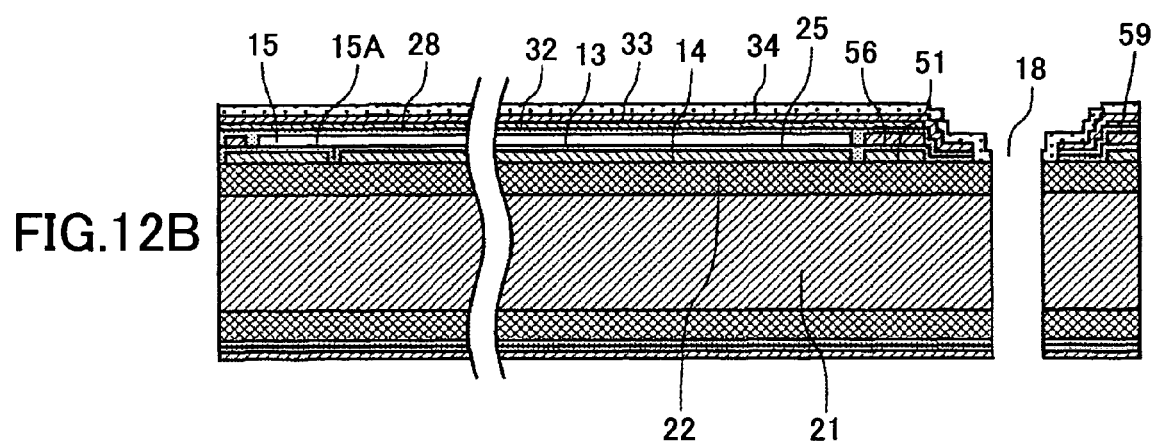
Figure 12C:
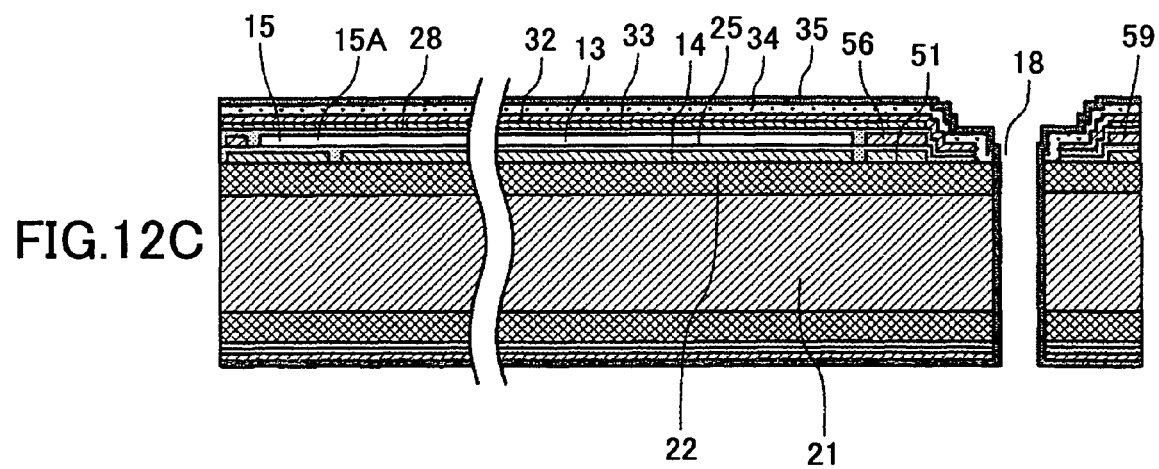
Figure 13D:
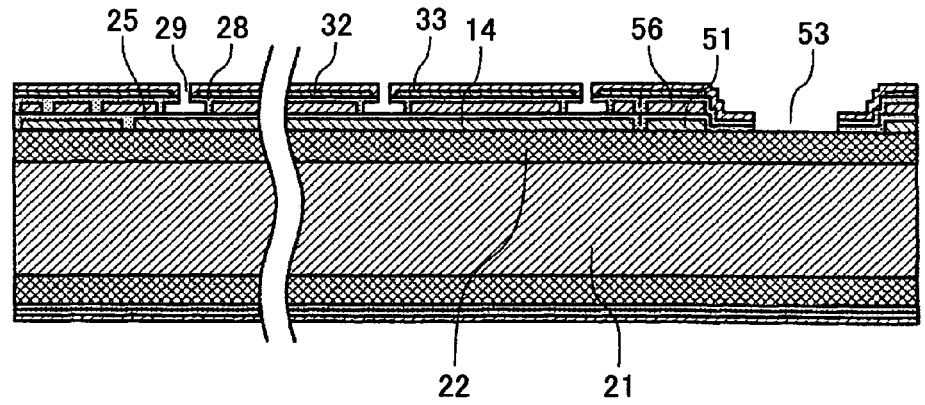
Figure 14A:
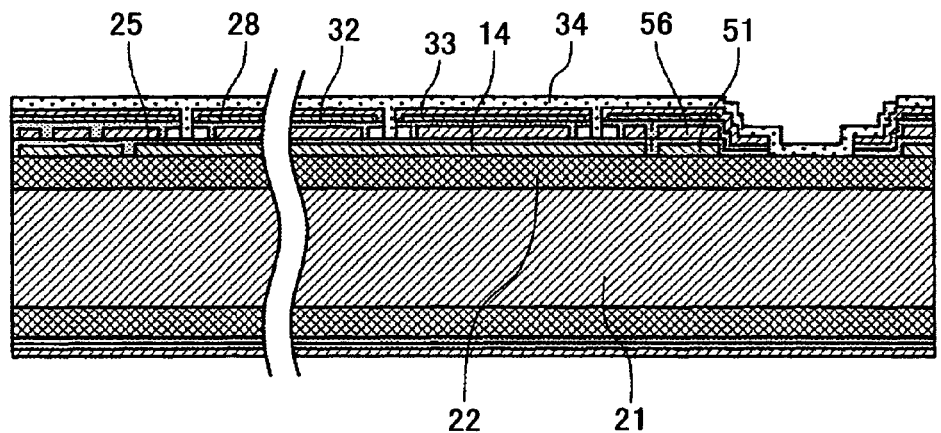
FIGS. 14A-14C are cross-sectional diagrams illustrating the process steps for manufacturing the actuator substrate continued from FIGS. 13A-13D.
Figure 14B:
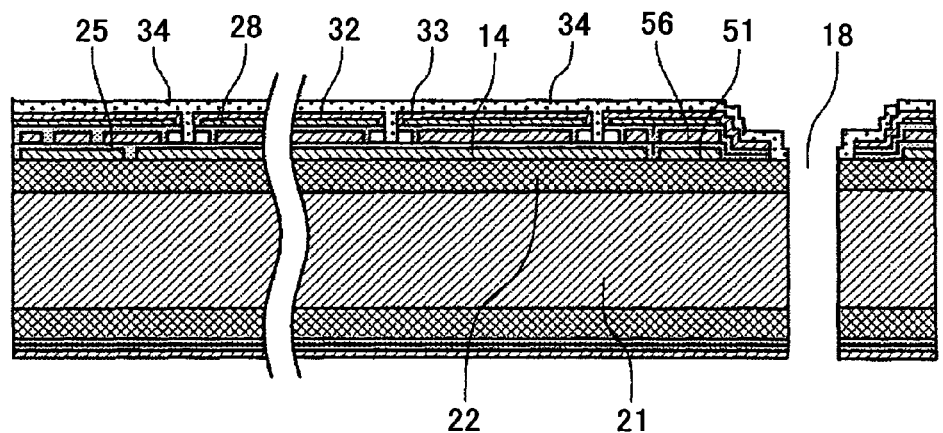
Figure 14C:
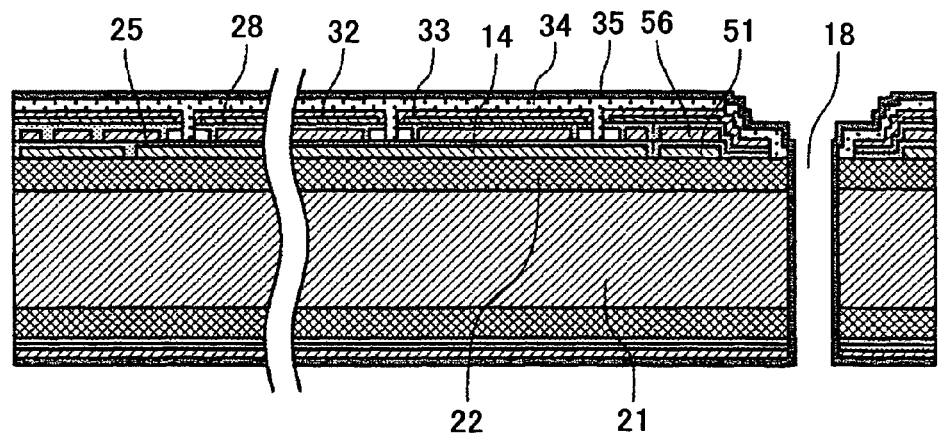

Then, as is shown in FIGS. 11D and 13D, the sacrificial layer removal holes 29 with a diameter of 2 μm are formed by etching through the nitride film corresponding to the sagging prevention layer 33 and the insulating film 28 through litho-etching, and the nitride film 33, the insulating film 28, and the insulating film 25 are removed at portions corresponding to the supply opening 18 to form processing holes 61 for creating the supply opening 18.

Then, sacrificial layer etching such as SF6 plasma processing or dry etching using XeF2 gas is performed to remove the portions 55 of the sacrificial layer 27 corresponding to the gaps 13, the portions 57 of the sacrificial layer 27 corresponding to the individual connection paths 15A, and the portion 58 of the sacrificial layer 27 corresponding to the common connection path 15 to create the gaps 13, the individual connection paths 15A, and the common connection path 15. It is noted that in the present example, dry etching is used in the sacrificial layer etching; however, the present invention is not limited to such an example, and sacrificial etching may also be realized through wet etching using a TMAH solution or a KOH solution, for example.

Figure 15D:
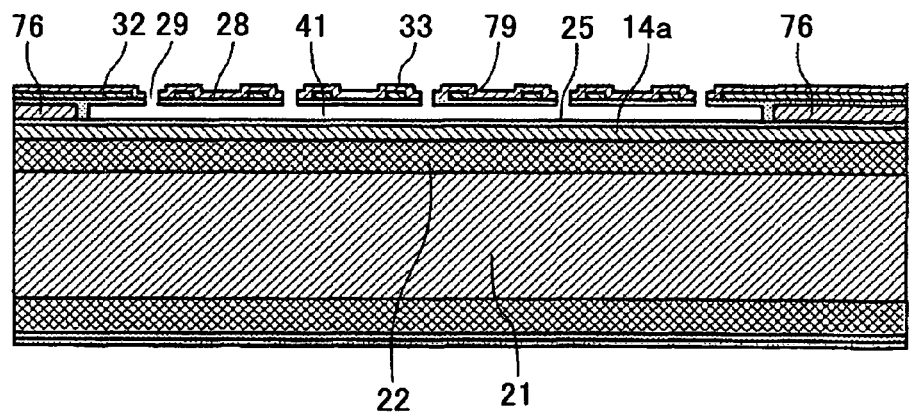
Figure 17D:
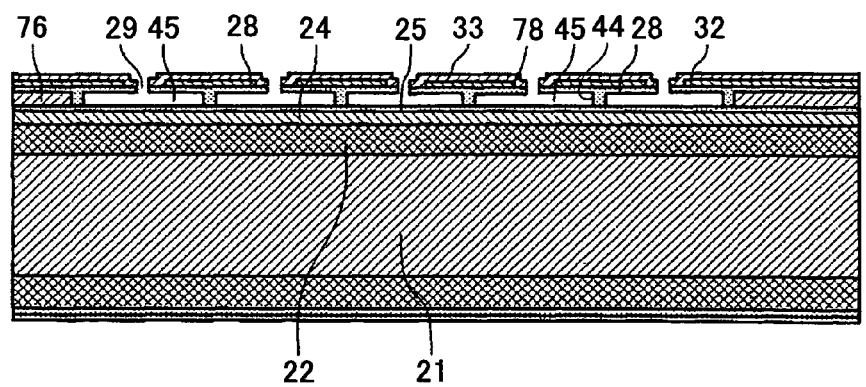

In this case, as is shown in FIGS. 15D and 17D, at the portion corresponding to the atmosphere connecting part 16, the sacrificial layer removal holes 29 with a diameter of 2 μm are etched through the nitride film 33 and the insulating film 28 by litho-etching. Then, by sacrificial layer etching, the portions 75a of the sacrificial layer 27 corresponding to the atmosphere connecting gap 41 and the portions 75b of the sacrificial layer 27 corresponding to the wobbled path 45 are removed so that the atmosphere connecting gap 41 and the wobbled path 45 may be formed.

Then, as is shown in FIGS. 12A, 14A, 16A, and 18A, the rigidity adjusting layer 34 is formed through an atmospheric pressure CVD process for sealing the sacrificial layer removal holes 29 and adjusting the rigidity of the oscillating plates 12. It is noted that the rigidity adjusting layer 34 is preferably arranged to have an adequate film thickness for sealing the sacrificial layer removal holes 29 (e.g., 0.6 μm). By forming the rigidity adjusting layer 34 in the manner described above, the gaps 13 may be sealed and isolated from the external atmosphere. In this case, the gaps 13 have a negative pressure with respect to the atmospheric pressure, and thereby, the oscillating plates 12 may be recessed toward the gaps 13. Then, as is shown in FIGS. 12B, 14B, 16B, and 18B, the rigidity adjusting film 34 and the insulating films 22 and 28 are removed from the portion corresponding to where that supply opening 18 is to be formed after which anisotropic etching is performed on the silicon substrate 21 using an ICP etcher, for example, to perforate the silicon substrate 21 from its upper face to form the supply opening 18. It is noted that by using anisotropic etching to form the supply opening 18, advantageous effects may be obtained such as enhanced shape processing control, finer processing capabilities, improved processing accuracy, and higher densification, for example.

Figure 16A:
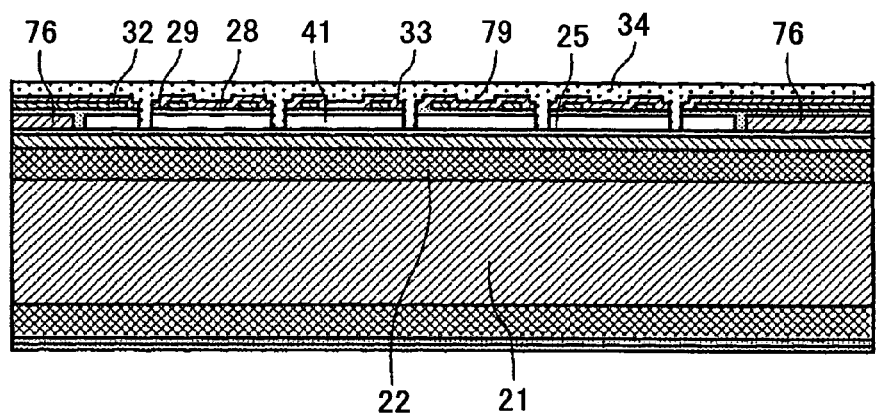
FIGS. 16A-16C are cross-sectional diagrams illustrating the process steps for manufacturing the actuator substrate continued from FIGS. 15A-15D.
Figure 16B:
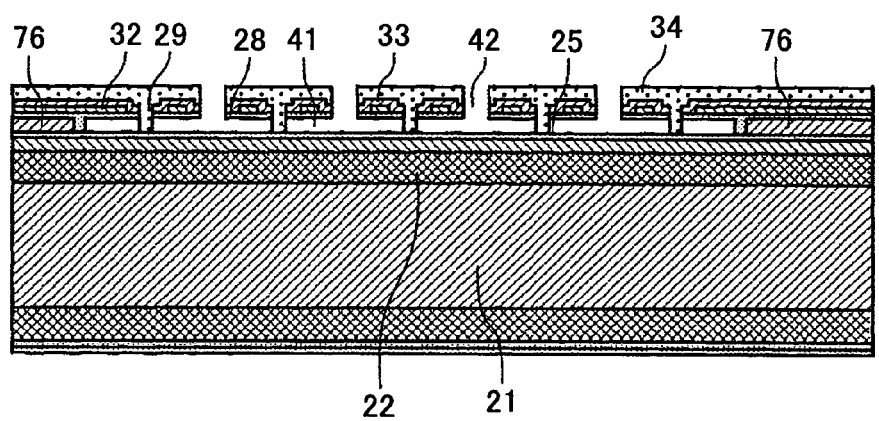
Figure 18A:
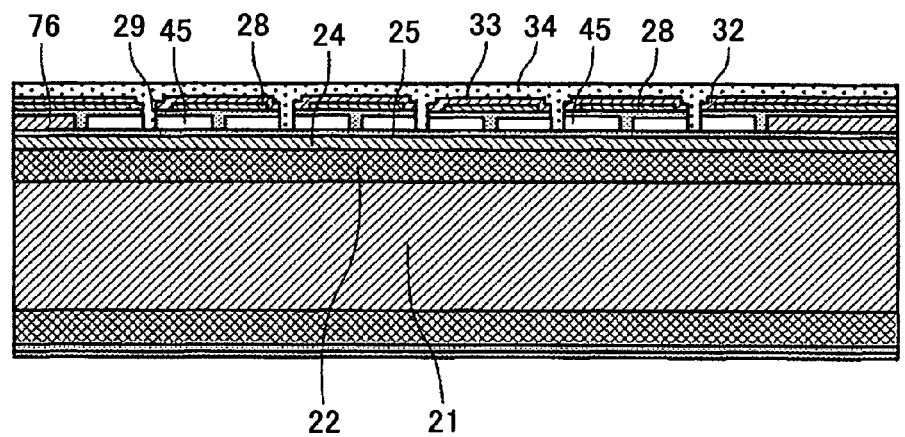
FIGS. 18A-18C are cross-sectional diagrams illustrating the process steps for manufacturing the actuator substrate continued from FIGS. 17A-17D.
Figure 18B:
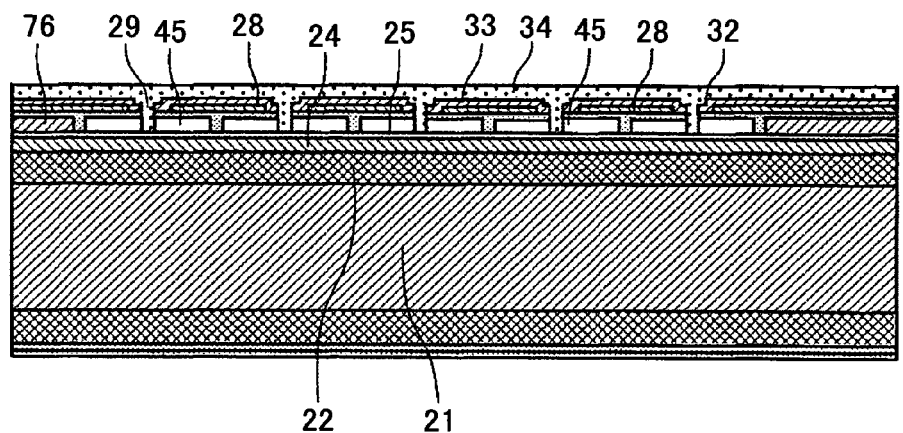

As is shown in FIGS. 16B and 18B, at the portion corresponding to where the atmosphere connecting part 16 is to be formed, the atmosphere connecting holes 42 are formed by etching the rigidity adjusting film 34 through litho-etching. In this way, the gaps 13 may be connected to the atmosphere via the individual connection paths 15A, the common connection path 15, the atmosphere connecting gap 41 including the wobbled path 45, and the atmosphere connecting holes 42, and the gaps maintained at a negative pressure may be readjusted to the atmospheric pressure. Also, gas may be introduced into the gaps 13 as is necessary or desired. In this case, HMDS (hexamethyl-disilazane) having hydrophobic properties may be introduced into the gaps 13 via the atmosphere connecting holes 42, the atmosphere connecting gap 41, the wobbled path 45, the common connection path 15, and the individual connection paths 15A in order to improve reliability of the oscillating plates 12.

Then, as is shown in FIGS. 12C, 14C, 16C, and 18C, the resin film 35 as a liquid contact film may be deposited on the actuator surface 1 at a film thickness of 1 μm through vapor deposition polymerization for effectively coating the actuator substrate surface. Then, portions corresponding to electrode wiring lead pads are etched by litho-etching. It is noted that exemplary materials that may be used for the resin film 35 include a PBO (polybenzoxazole) film, a polyimide film, a polyparaxylene film. However, the present invention is not limited to such examples, and any material having corrosion resistance against the recording liquid that may be fabricated through vapor deposition polymerization may be used.

Figure 16C:
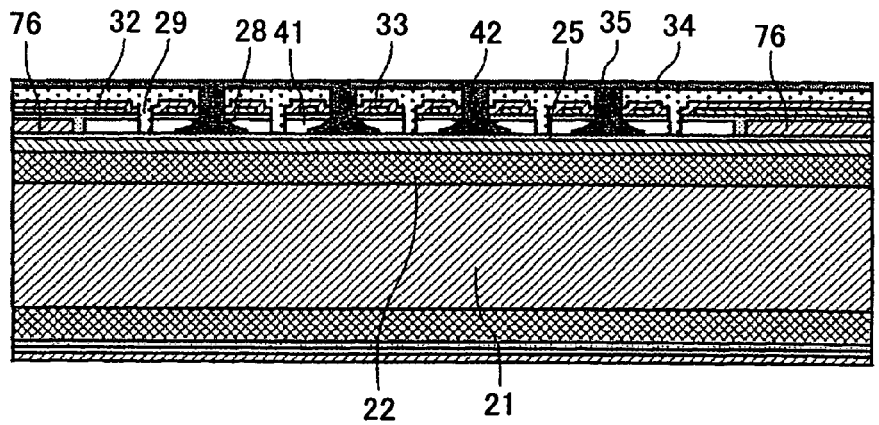
Figure 18C:
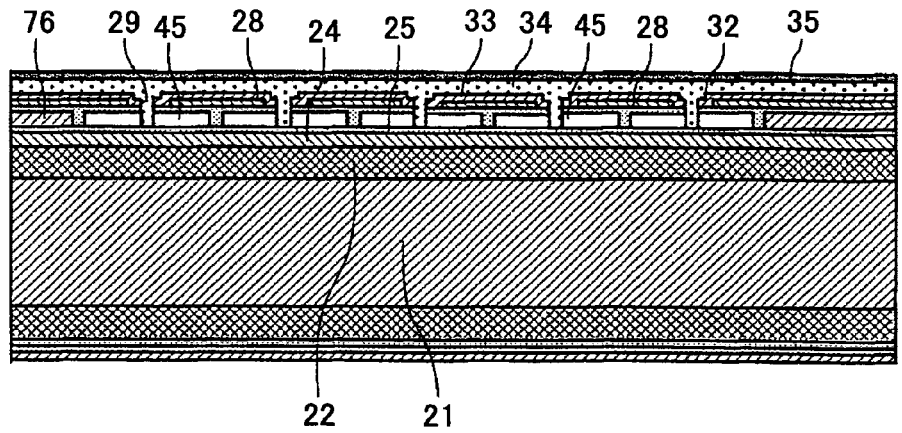

As is shown in FIGS. 16C and 18C, at the atmosphere connecting portion 16, the resin forming the resin film 35 penetrates into the atmosphere connecting gap 41 via the atmosphere connecting holes 42. The resin moves toward the common connection path 15 due to the capillary effect since the atmosphere connection gap is narrow. However, since the wobbled path 45 that acts as a resistance against the penetration of the resin is arranged in the atmosphere connecting gap 41, the resin is trapped at the wobbled path 45 and is prevented from reaching the common connection path 15.

Also, the resin seals the atmosphere connecting holes 42 to prevent foreign matter such as dust and moisture from penetrating into the gaps 13 from the exterior. Also, gas introduced into the gaps 13 may be prevented from being diffused to the exterior. It is noted that in the present example, the sealing of the atmosphere connecting holes 42 and formation of the liquid contacting film are performed simultaneously. However, the present invention is not limited to such an example, and in another example, a sealing agent such as epoxy adhesive may be used to seal the atmosphere connecting holes 42 before forming the liquid contacting film.

By performing the process steps as is described above, the actuator substrate 1 as an electrostatic actuator according to an embodiment of the present invention may be fabricated.

Also, by successively depositing the actuator substrate 1, the flow path substrate 2, and the nozzle substrate 3, a liquid discharge head including the electrostatic actuator according to the present embodiment may be manufactured.

Figure 19:
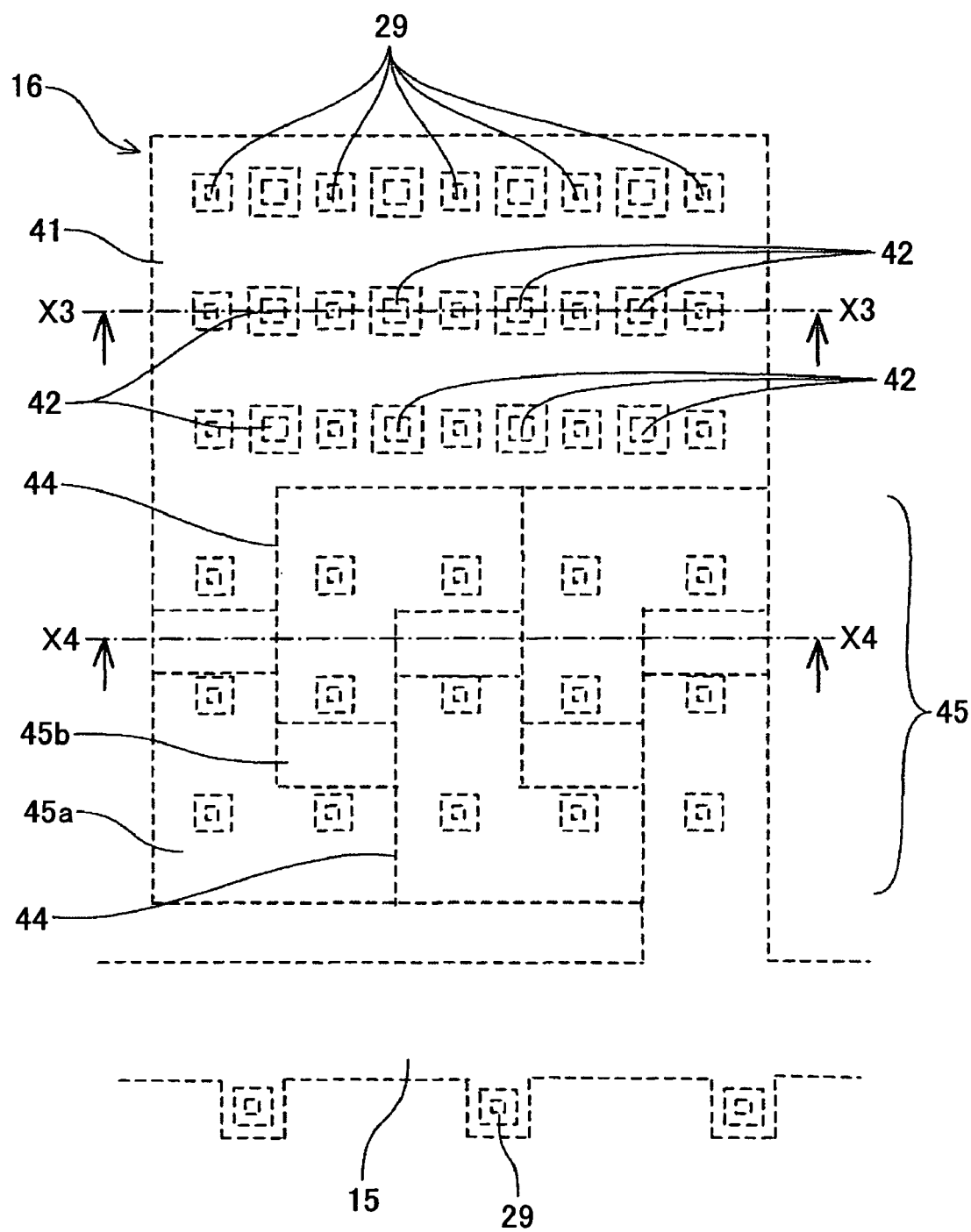
FIG. 19 is a plan view of a portion of an actuator substrate according to a second embodiment of the present invention corresponding to where an atmosphere connecting part is formed.
Figure 20:
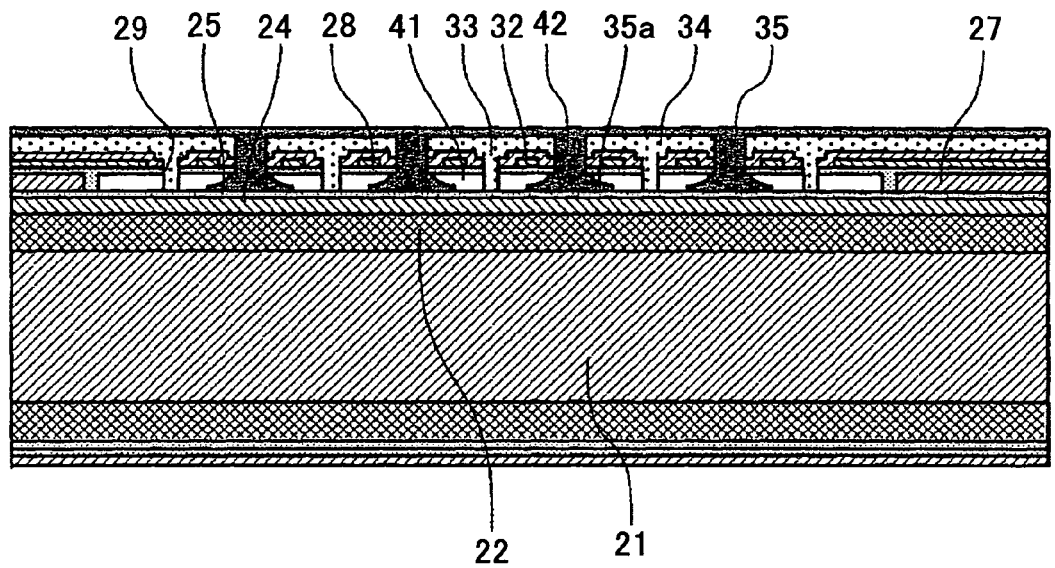
FIG. 20 is a cross-sectional diagram showing a cross section of the actuator substrate portion of FIG. 19 cut across line X3-X3.
Figure 21:
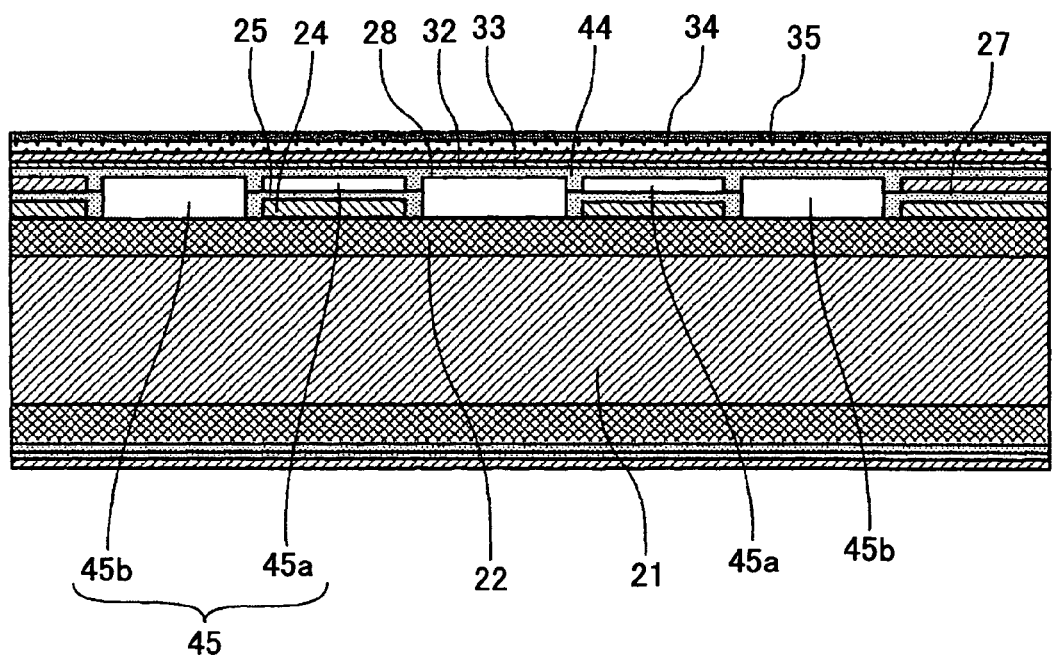
FIG. 21 is a cross-sectional diagram showing a cross section of the actuator substrate portion of FIG. 19 cut across line X4-X4.

In the following, an electrostatic actuator according to a second embodiment of the present invention is described with reference to FIGS. 19 through 21. FIG. 19 is a plan view of an actuator substrate of the electrostatic actuator according to the present invention; FIG. 20 is a cross-sectional view of the actuator substrate cut across line X3-X3 of FIG. 19; and FIG. 21 is a cross-sectional view of the actuator substrate cut across line X4-X4 of FIG. 19. It is noted that in these drawings components that have identical functions as the components shown in FIGS. 8 through 10 are given the same reference numerals.

According to the present embodiment, the wobbled path 45 of the atmosphere connecting gap 41 connecting the atmosphere connecting holes 42 to the common connection path 15 include portions having different gap heights (i.e., high level portions and low level portions). Specifically, the wobbled path 45 includes path portions 45a with a relatively low gap height like the rest of the atmosphere connecting gap 41 portions and path portions 45b with a relatively high gap height compared to the rest of the atmosphere connecting gap 41 portions. The path portions 45a of the wobbled path 45 are created by etching the sacrificial layer 27 through sacrificial layer etching. The path portions 45b are created by removing the insulating film 25 deposited on the electrode forming layer 24 to simultaneously etch the electrode forming layer 24 and the sacrificial layer 27 in the sacrificial layer etching process.

As can be appreciated, in the present embodiment, the wobbled path 45 having the path portion 45b with the relatively low gap height and the path portion 45b with the relatively high gap height is arranged at a portion of the atmosphere connecting gap 41 that is connected to the common connection path 15. In this way, when the atmosphere connecting holes 42 are sealed with the resin film 35, since the gap height of the atmosphere connecting gap 41 of the atmosphere connecting part 16 is about 0.1-0.5 μm, the resin film 35 penetrates into the atmosphere connecting gap 41 from the atmosphere connecting holes 42 due to the capillary effect and reaches the wobbled path 45. However, the resin may be trapped inside the wobbled path 45 by the path portions 45b with the relatively high gap height so that the resin may be prevented from penetrating into the common connection path 15.

With such a configuration, the penetration of the resin film 35 into the gaps 13 may be prevented even more effectively compared to the first embodiment so that an electrostatic actuator with high accuracy, high density, and high reliability may be manufactured. Also, a liquid discharge head with high accuracy, high density, and high reliability may be manufactured with improved productivity, production efficiency, and dimension controllability.

In the following, a method for manufacturing the actuator substrate 1 according to the second embodiment is described with reference to FIGS. 22A through 25C. FIGS. 22A-23C are cross-sectional views cut across line X3-X3 of FIG. 19; and FIGS. 24A-25C are cross-sectional views cut across line X4-X4 of FIG. 19. It is noted that the processes for creating the portion where the actuator elements (e.g., oscillating plate areas 12A and individual electrodes 14) are arranged are identical to the processes used for the actuator substrate according to the first embodiment, and thereby, their descriptions are omitted below. Specifically, in the following, processes for creating the portion corresponding to the atmosphere connecting part 16 are described.

Figure 22A:
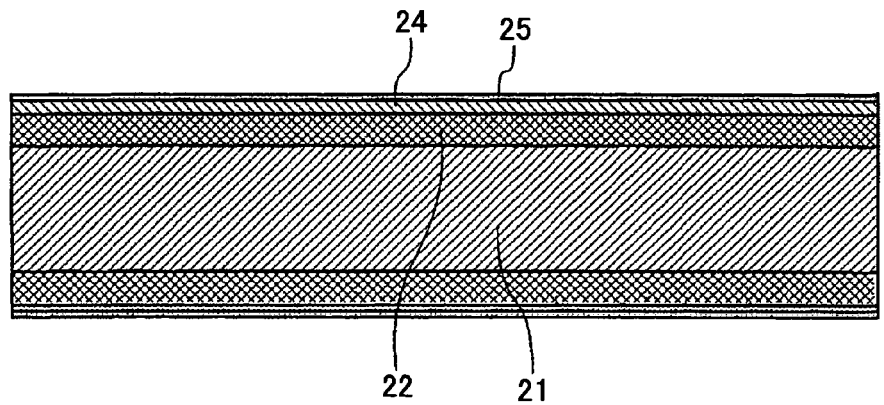
FIGS. 22A-22D are cross-sectional diagrams corresponding to cross sections cut across line X3-X3 of FIG. 19 that illustrate process steps for manufacturing the actuator substrate of the second embodiment.
Figure 24A:
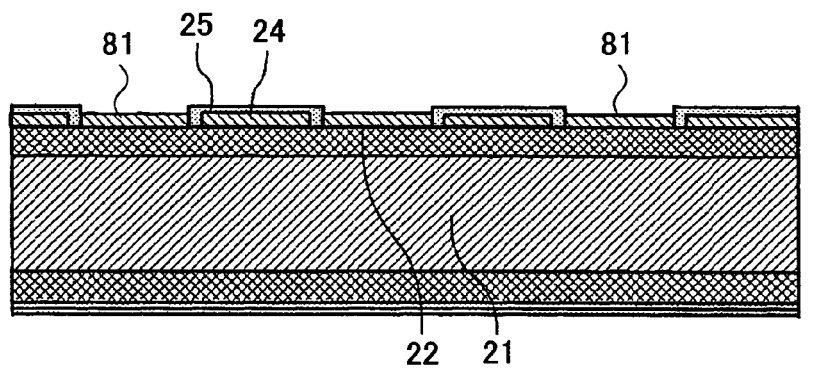
FIGS. 24A-24D are cross-sectional diagrams corresponding to cross sections cut across line X4-X4 of FIG. 19 that illustrate the process steps for manufacturing the actuator substrate of the second embodiment.

As is shown in FIGS. 22A and 24A, an insulating film (thermal oxide film) 22 with a thickness of 1.6 μm is arranged on the face (on both the upper and lower faces in the illustrated example) of a silicon (Si) substrate 21 with a thickness of 400 μm, for example. Then, P-doped polysilicon is deposited on the insulating film 22 at a film thickness of 0.3 μm as the electrode forming layer 24 for forming the individual electrodes 14. Then, at the portion corresponding to where the atmosphere connecting part 16 is formed, separating grooves are patterned on the polysilicon layer 24 for separating portions 81 of the polysilicon layer 24 that are to be etched to become the path portions 45b of the wobbled path 45 with the relatively high gap height. Then, a CVD oxide film with a thickness of 0.1 μm is deposited over the polysilicon pattern to form the insulating film 25. Then, portions of the insulating film 25 arranged above the portions 81 corresponding to the path portions 45b of the wobbled path 45 with the relatively high gap height are removed.

Figure 22B:
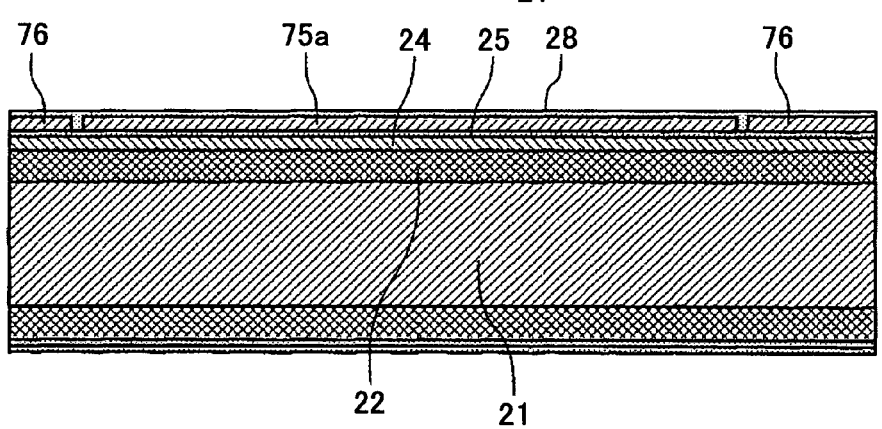
Figure 24B:
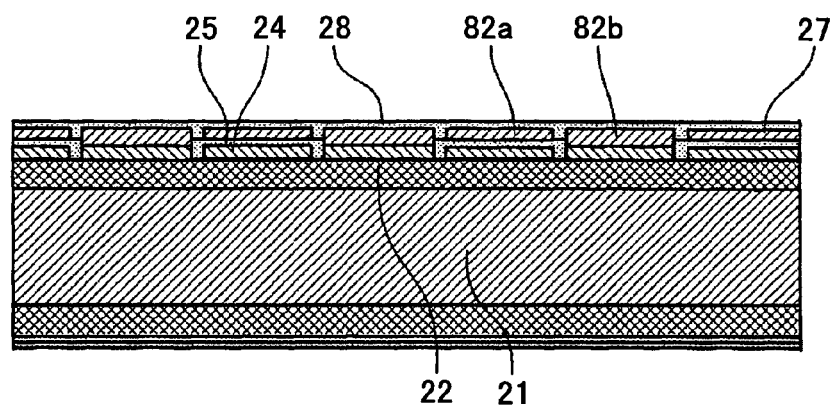

Then, as is shown in FIGS. 22B and 24B, non-doped polysilicon is deposited on the insulating film 25 to form the sacrificial layer 27. Then, litho-etching is performed on the polysilicon layer to pattern and divide the polysilicon into a portion 75a corresponding to the atmosphere connecting gap 41, portions 82a corresponding to the path portions 45a and portions 82b corresponding to the path portions 45b of the wobbled path 45, and portions 76 corresponding to the partitioning walls. Then, the insulating film 28 is deposited over the polysilicon pattern.

Figure 22C:
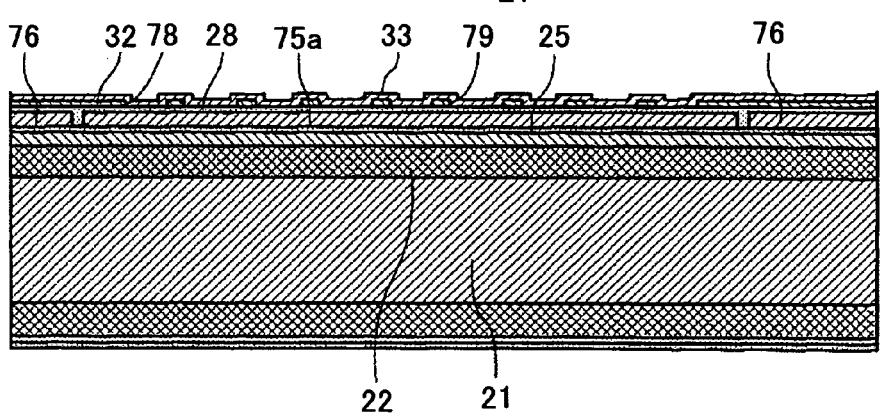
Figure 24C:
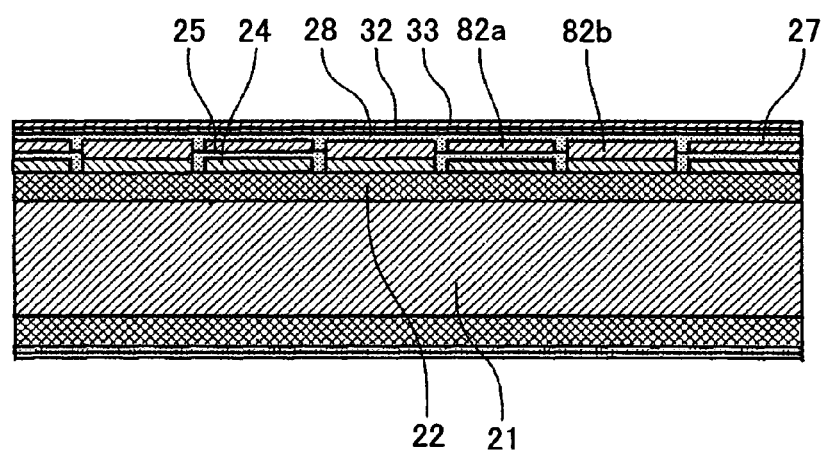

Then, as is shown in FIGS. 22C and 24C, a P-doped polysilicon layer as the oscillating plate electrode layer 32 is deposited on the insulating film 28 at a film thickness of 0.1 μm, and this polysilicon layer is patterned and divided by litho-etching so that openings 78 having a greater diameter than the sacrificial layer removal holes 29 and openings 79 having a greater diameter than the atmosphere connecting holes 42 are formed. Then, a nitride film as the sagging prevention layer 33 is deposited over the polysilicon pattern including the openings 78 and 79.

Figure 22D:
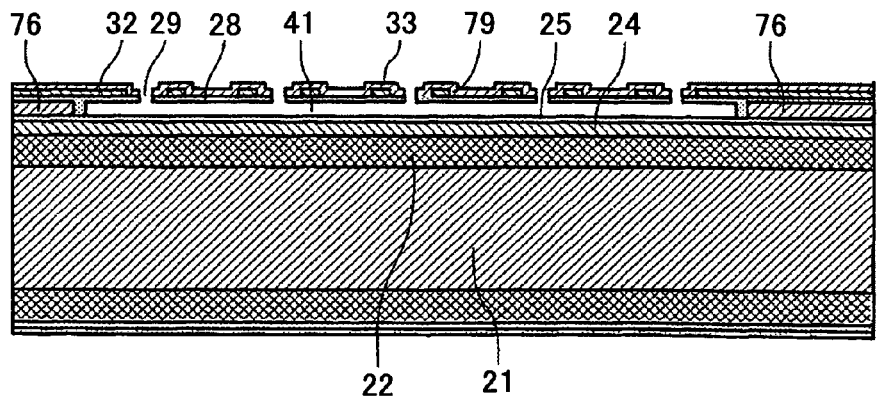
Figure 24D:
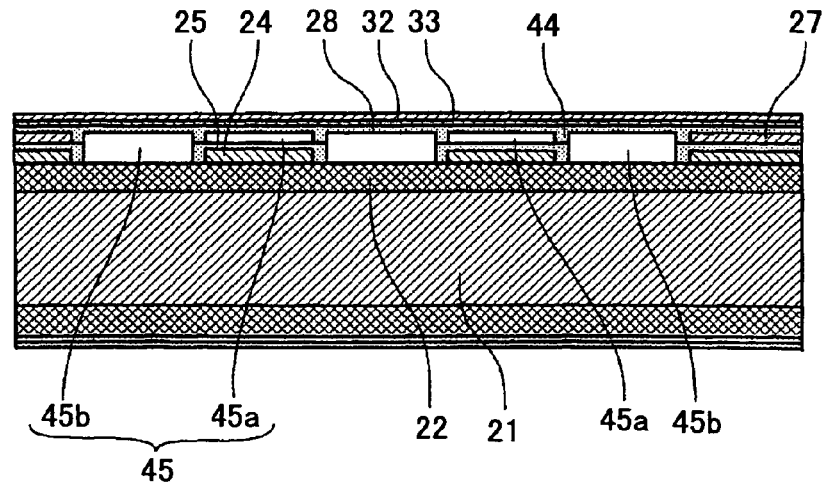

Then, as is shown in FIGS. 22D and 24D, the sacrificial layer removal holes 29 with a diameter of 2 μm are formed through litho-etching through the sagging prevention film 33 and the insulating film 28. Then, sacrificial layer etching is performed via the sacrificial layer removal holes 29 to remove the portion 75a of the sacrificial layer 27 corresponding to the atmosphere connecting gap 41, and the portions 82a and 82b of the sacrificial layer 27 corresponding to the path portions 45a and 45b of the wobbled path 45. In this way, the atmosphere connecting gap 41, the path portion 45b of the wobbled path 45 with the relatively low gap height, and the path portions 45a of the wobbled path 45 with the relatively high gap height may be formed.

Figure 23A:
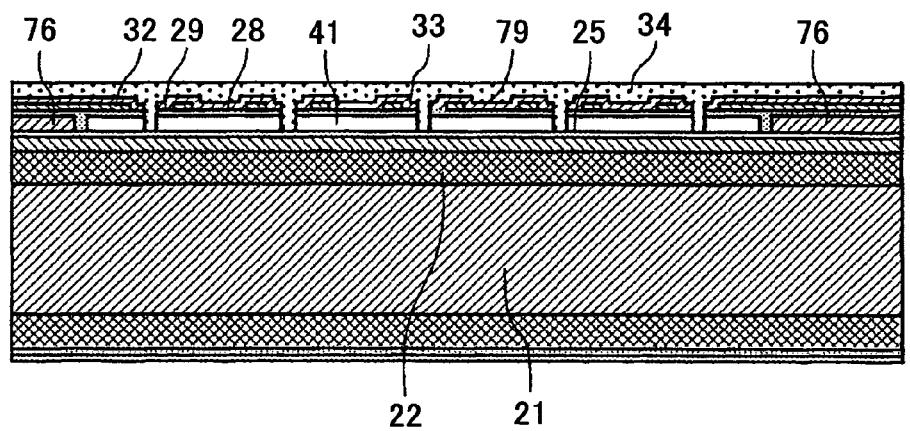
FIGS. 23A-23C are cross-sectional diagrams illustrating the process steps for manufacturing the actuator substrate continued from FIGS. 22A-22D.
Figure 23B:
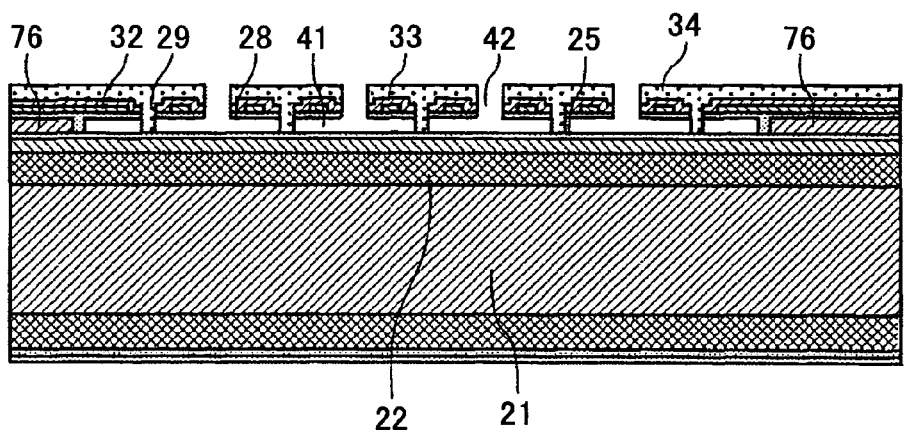
Figure 23C:
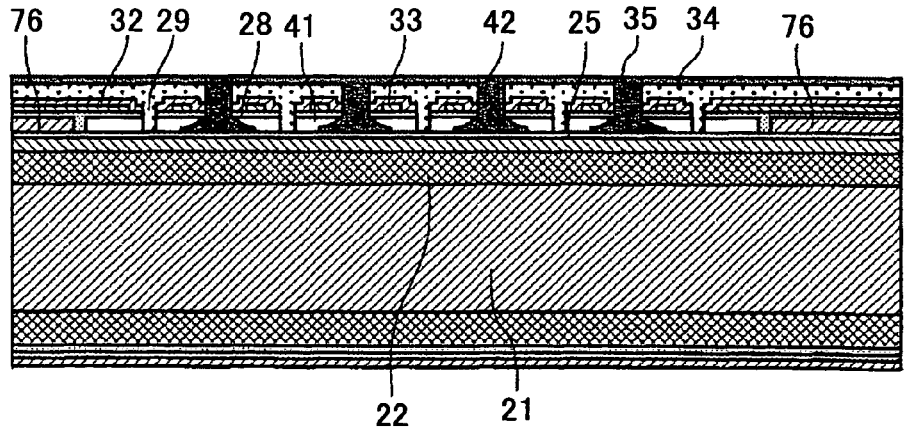
Figure 25A:
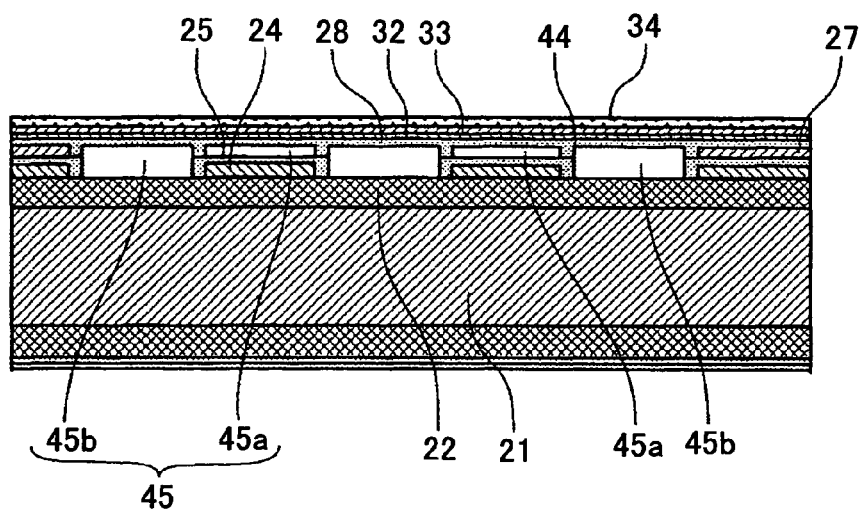
FIGS. 25A-25C are cross-sectional diagrams illustrating the process steps for manufacturing the actuator substrate continued from FIGS. 24A-24D.
Figure 25B:
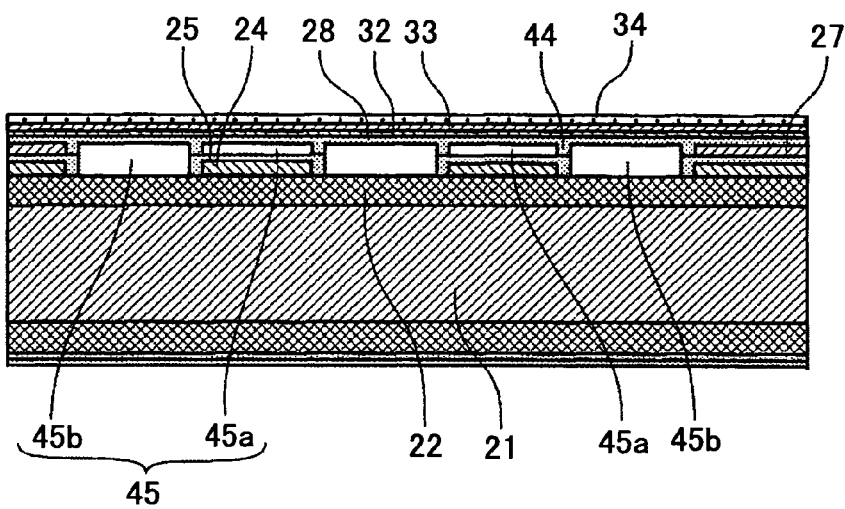
Figure 25C:
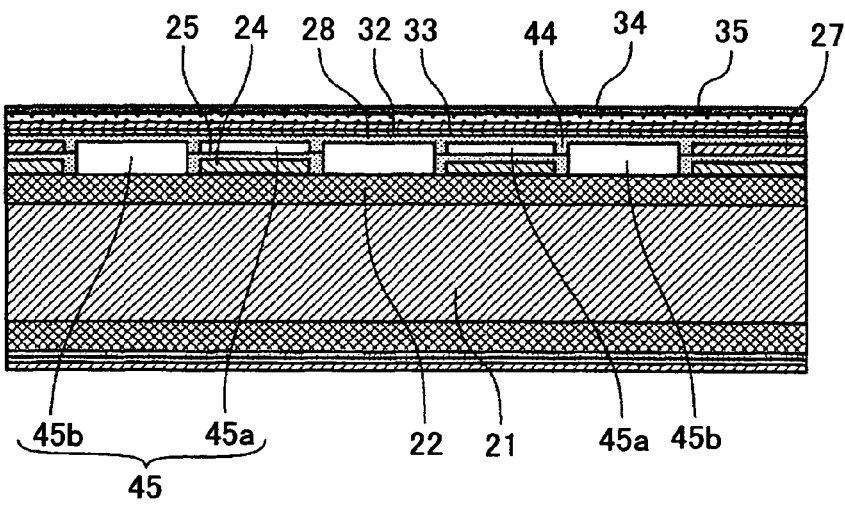

Then, processes similar to those for manufacturing the actuator substrate 1 according to the first embodiment are performed as is shown in FIGS. 23A-23C and FIGS. 25A-25C. In this case, as is shown in FIGS. 23C and 25C, resin for forming the resin film 35 penetrates into the atmosphere connecting gap 41 from the atmosphere connecting holes 42. Since the atmosphere connecting gap 41 is narrow, the resin penetrating into the atmosphere connecting gap moves toward the common connection path as a result of the capillary effect. However, since the wobbled path 45 that acts as a resistance against penetration of the resin is arranged in the atmosphere connecting gap 41 and height differences are created within the wobbled path 45, the resin may be trapped within the wobbled path to be prevented from reaching the common connection path.

Figure 26:
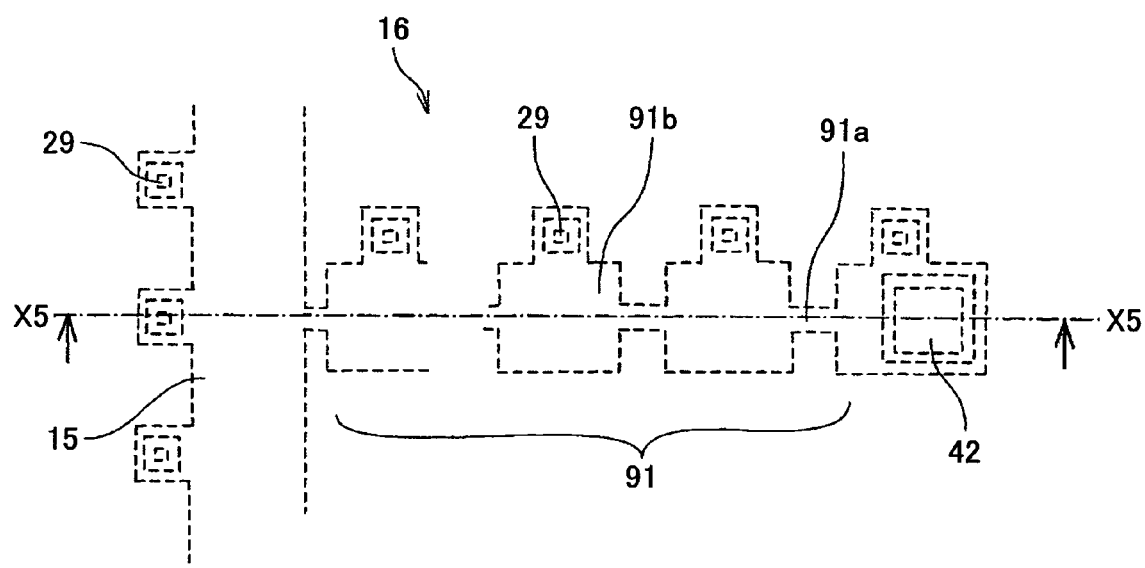
FIG. 26 is a plan view of a portion of an actuator substrate according to a third embodiment of the present invention corresponding to where an atmosphere connecting part is formed.
Figure 27:
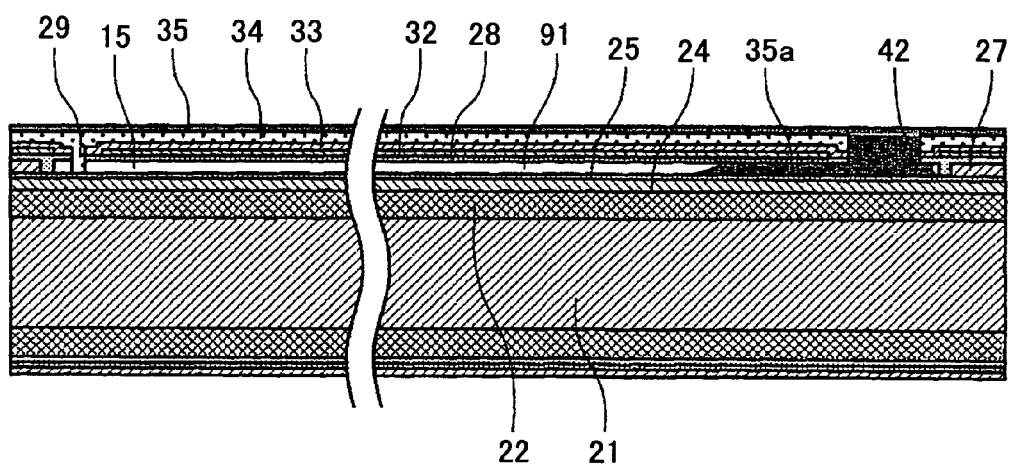
FIG. 27 is a cross-sectional diagram showing a cross section of the actuator substrate portion of FIG. 26 cut across line X5-X5.

In the following, an actuator substrate 1 according to a third embodiment of the present invention is described with reference to FIGS. 26 and 27. FIG. 26 is a plan view of the atmosphere connecting part 16 portion of the actuator substrate according to the present embodiment, and FIG. 27 is a cross-sectional view of the actuator substrate cut across line X5-X5 of FIG. 26.

According to the present embodiment, one atmosphere connecting hole 42 is formed, and the atmosphere connecting hole 42 and the common connection path 15 are connected via a resistance path 91 including a narrow path portion (constricted portion) 91a with a relatively small width and a relatively small cross-sectional area in plan view and a wide path portion 91b with a relatively large width and a large cross-sectional area in plan view. The constricted portions 91a of the resistance path 91 act as resistance elements against the penetration of a sealing agent 35a into the common connection path 15. In this way, resin material for forming a liquid contacting film 35 may be prevented from penetrating into the common connection path 15.

According to the first and second embodiments as is described above, the plural atmosphere connecting holes 42 are arranged on the actuator substrate 1. However, it is noted that the size of the liquid discharge head is preferably arranged to be small in order to improve production yield and increase the number of chips per wafer for forming the liquid discharge head. In this respect, the substrate area dedicated to the atmosphere connecting part 16 is preferably small, and the number of the atmosphere connecting holes 42 is preferably small provided that atmosphere exposure and gas introduction are enabled.

Accordingly, in the present embodiment, the one atmosphere connecting hole 42 is provided and sacrificial layer removal holes 29 are formed on the path portions 91b of the resistance path 91 having a relatively large cross-sectional area. In this way, the sacrificial layer removal may be adequately performed, the sealing agent 35a may be prevented from penetrating into the common connection path 15, and the substrate area occupied by the atmosphere connecting part 16 may be reduced.

Figure 28:
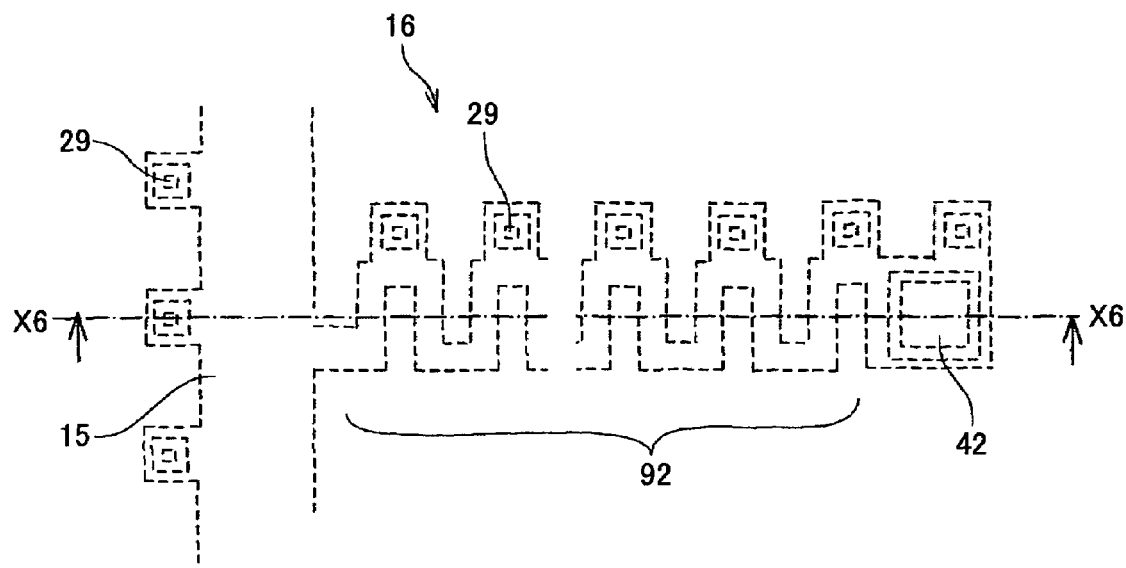
FIG. 28 is a plan view of a portion of an actuator substrate according to a fourth embodiment of the present invention corresponding to where an atmosphere connecting part is formed.
Figure 29:
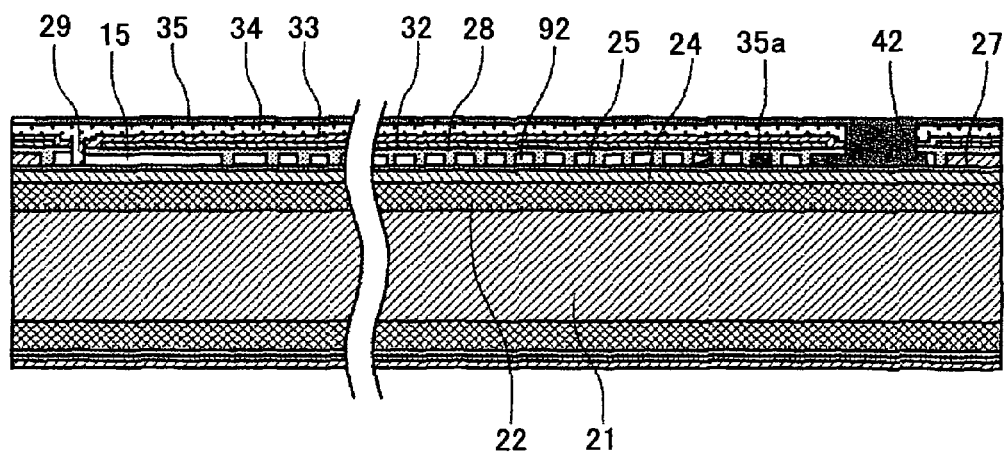
FIG. 29 is a cross-sectional diagram showing a cross section of the actuator substrate portion of FIG. 28 cut across line X6-X6.

In the following, an actuator substrate according to a fourth embodiment of the present invention is described with reference to FIGS. 28 and 29. FIG. 28 is a plan view of the atmosphere connecting part of the actuator substrate according to the present embodiment, and FIG. 29 is a cross-sectional view of the atmosphere connecting part cut across line X6-X6 of FIG. 28.

According to the present embodiment, one atmosphere connecting hole 42 is formed on the actuator substrate, the atmosphere connecting hole 42 is connected to the common connection path 15 via a wobbled path 92 as a resistance path that wobbles back and forth in a substantially perpendicular manner, and the sacrificial layer removal holes 29 are arranged at the outer side (outside the pathway) of the wobbled path 92. In this way, sacrificial layer removal may be adequately performed, penetration of a sealing agent into the common connection path 15 may be prevented, and the substrate area occupied by the atmosphere connecting part 16 may be reduced as in the third embodiment.

It is noted that in the third and fourth embodiments as is described above, the atmosphere connecting holes 29 are arranged outside the pathway of the resistance path 91 or the wobbled path 92; however, the sacrificial layer removal holes 29 may alternatively be arranged within the pathway of the resistance path 91 or the wobbled path 92 in order to further reduce the area occupied by the atmosphere connecting part 16.

Figure 30:
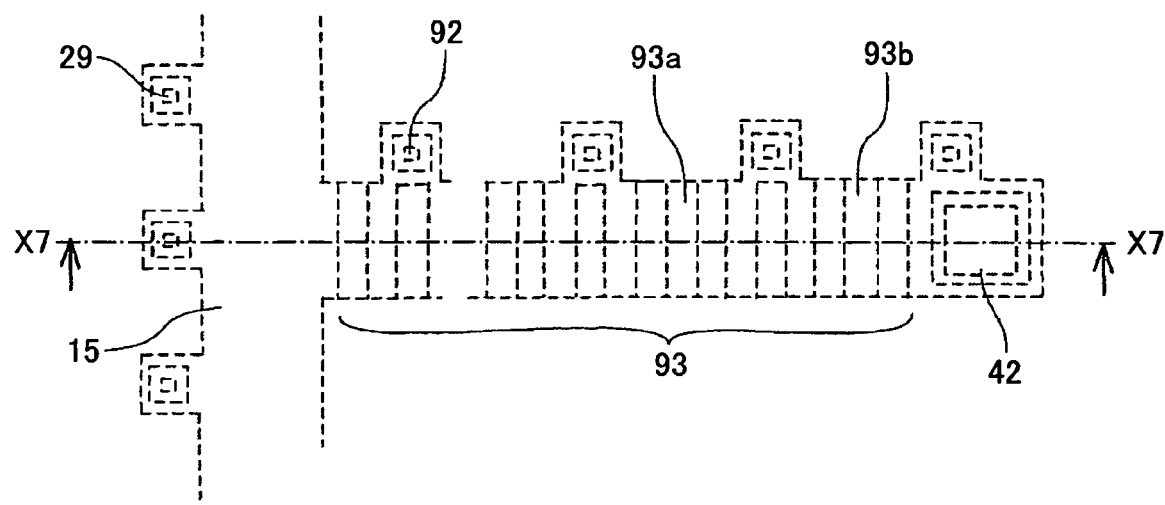
FIG. 30 is a plan view of a portion of an actuator substrate according to a fifth embodiment of the present invention corresponding to where an atmosphere connecting part is formed.
Figure 31:
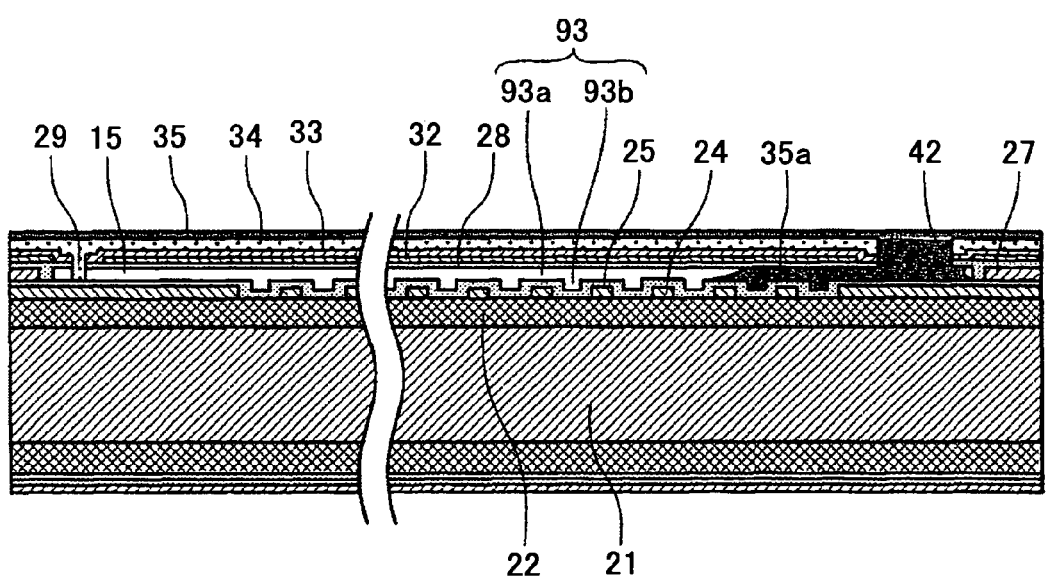
FIG. 31 is a cross-sectional diagram showing a cross section of the actuator substrate portion of FIG. 30 cut across line X7-X7.

In the following, an actuator substrate according to a fifth embodiment of the present invention is described with reference to FIGS. 30 and 31. FIG. 30 is a plan view of an atmosphere connecting part of the actuator substrate according to the present embodiment, and FIG. 31 is a cross-sectional view of the atmosphere connecting part cut across line X7-X7 of FIG. 30.

According to the present embodiment, one atmosphere connecting hole 42 is formed on the actuator substrate, and the atmosphere connecting hole 42 is connected to the common connection path 15 via a resistance path 93 that has path portions having different gap heights. Specifically, the resistance path 93 includes portions 93a with a relatively low gap height (small cross-sectional area) and portions 93b with a relatively high gap height (large cross-sectional area) that are alternatingly arranged. In other words, recessed portions (portions 93b with the relatively high gap height) are created across the bottom face of the resistance path 93 that extend over the entire width of the resistance path 93.

Figure 32:
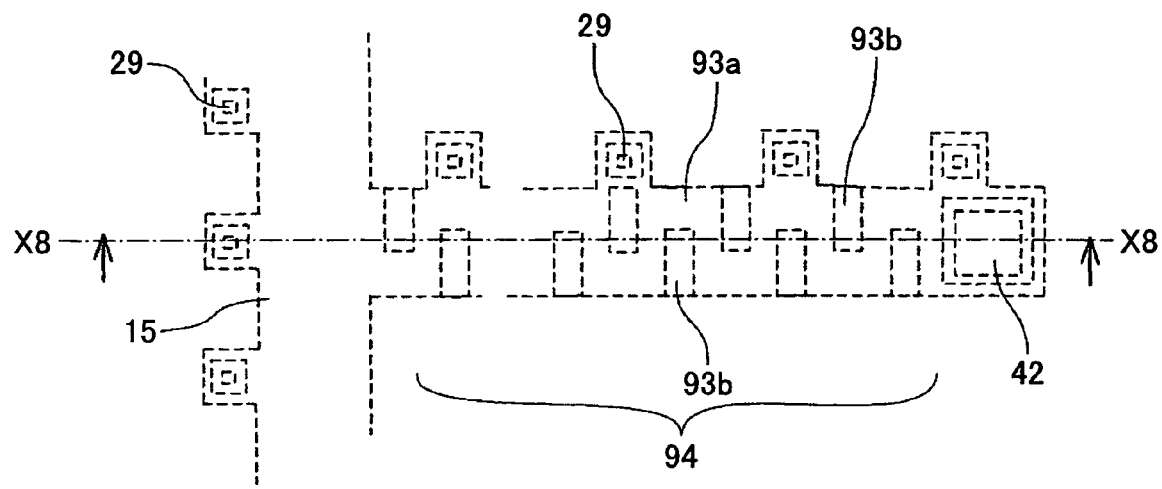
FIG. 32 is a plan view of a portion of an actuator substrate according to a sixth embodiment of the present invention corresponding to where an atmosphere connecting part is formed.
Figure 33:
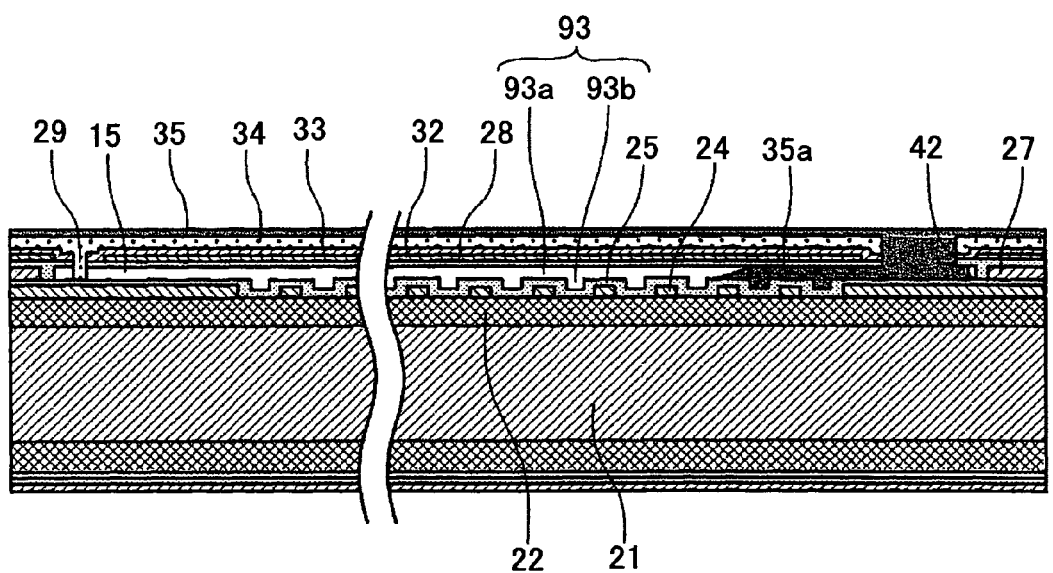
FIG. 33 is a cross-sectional diagram showing a cross section of the actuator substrate portion of FIG. 32 cut across line X8-X8.

In the following, an actuator substrate according to a sixth embodiment of the present invention is described with reference to FIGS. 32 and 33. FIG. 32 is a plan view of an atmosphere connecting part of the actuator substrate according to the present embodiment, and FIG. 33 is a cross-sectional view of the atmosphere connecting part cut across line X8-X8 of FIG. 32.

According to the present embodiment, one atmosphere connecting hole 42 is formed on the actuator substrate, and the atmosphere connecting hole 42 is connected to the common connection path 15 via a resistance path 94 that includes portions having different gap heights. Specifically, the resistance path 94 portions 94a with a relatively low gap height (small cross-sectional area) and portions 94b with a relatively high gap height (large cross-sectional area) that are alternatingly arranged as in the fifth embodiment. However, in the present embodiment, the portions 94b with the relatively high gap height are arranged across a section of the width of the resistance path 94.

Figure 34:
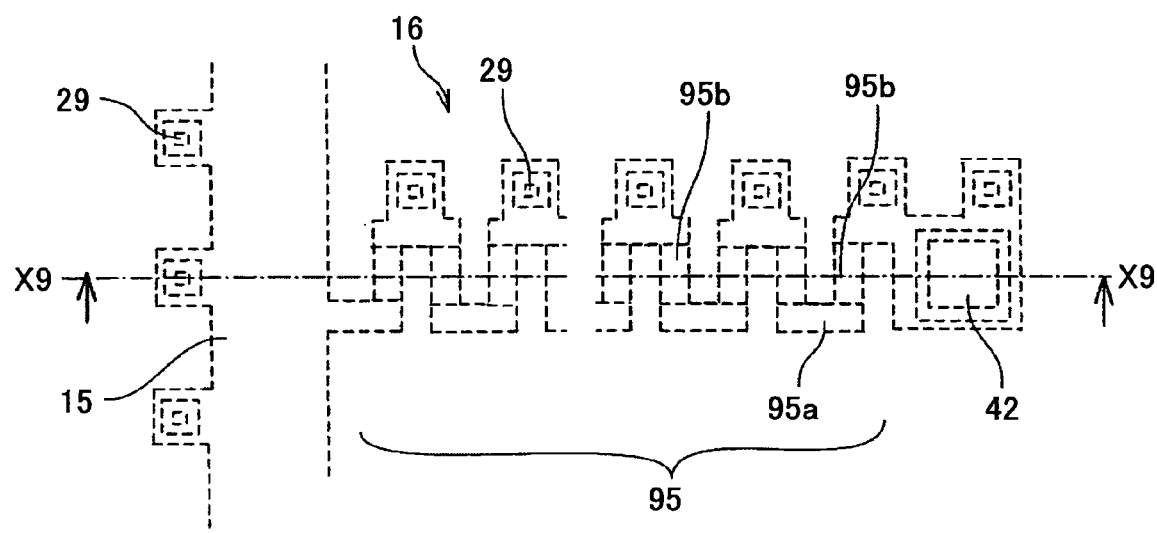
FIG. 34 is a plan view of a portion of an actuator substrate according to a seventh embodiment of the present invention corresponding to where an atmosphere connecting part is formed.
Figure 35:
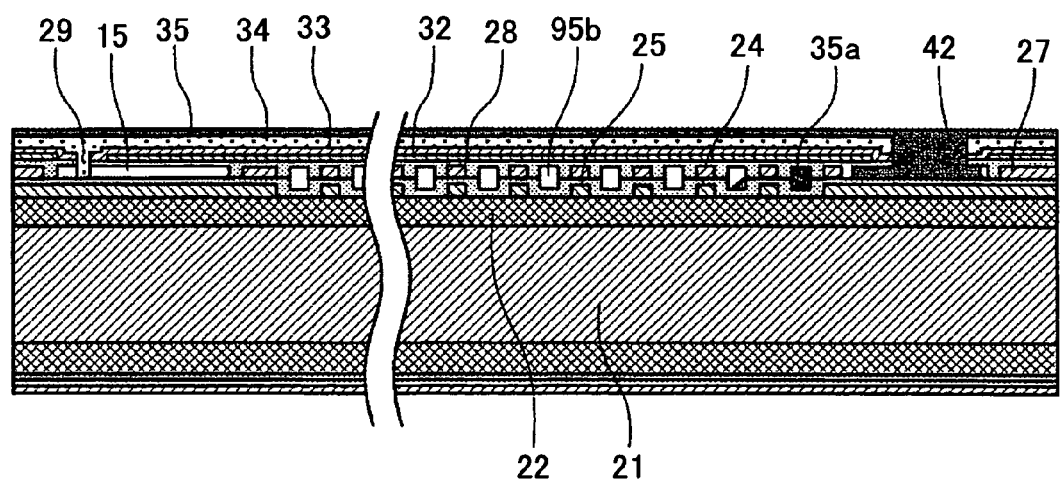
FIG. 35 is a cross-sectional diagram showing a cross section of the actuator substrate portion of FIG. 34 cut across line X9-X9.

In the following, an actuator substrate according to a seventh embodiment of the present invention is described with reference to FIGS. 34 and 35. FIG. 34 is a plan view of an atmosphere connecting part of the actuator substrate according to the present embodiment, and FIG. 35 is a cross-sectional view of the atmosphere connecting part cut across line X9-X9 of FIG. 34.

According to the present embodiment, one atmosphere connecting hole 42 is formed on the actuator substrate, and the atmosphere connecting hole 42 is connected to the common connection path 15 via a wobbled path 95 that includes portions having different gap heights and wobbles back and forth in a substantially perpendicular manner. Specifically, the wobbled path 95 wobbles back and forth as is shown in FIG. 34, and includes portions 95a with a relatively low gap height (small cross-sectional area) and portions 95b with a relatively high gap height (large cross-sectional area) that are alternatingly arranged.

Figure 36:
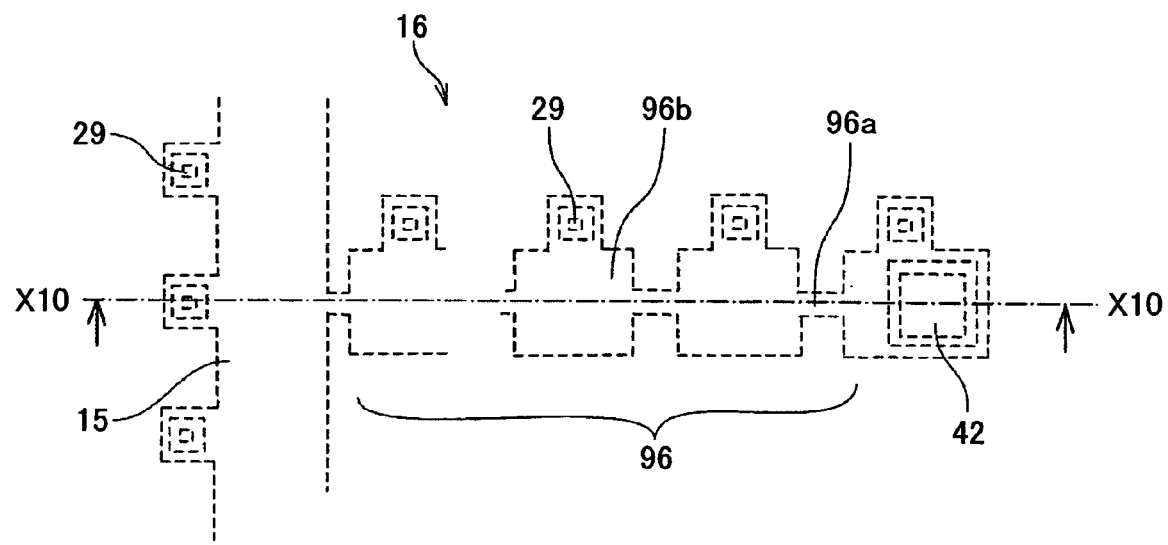
FIG. 36 is a plan view of a portion of an actuator substrate according to an eighth embodiment of the present invention corresponding to where an atmosphere connecting part is formed.
Figure 37:
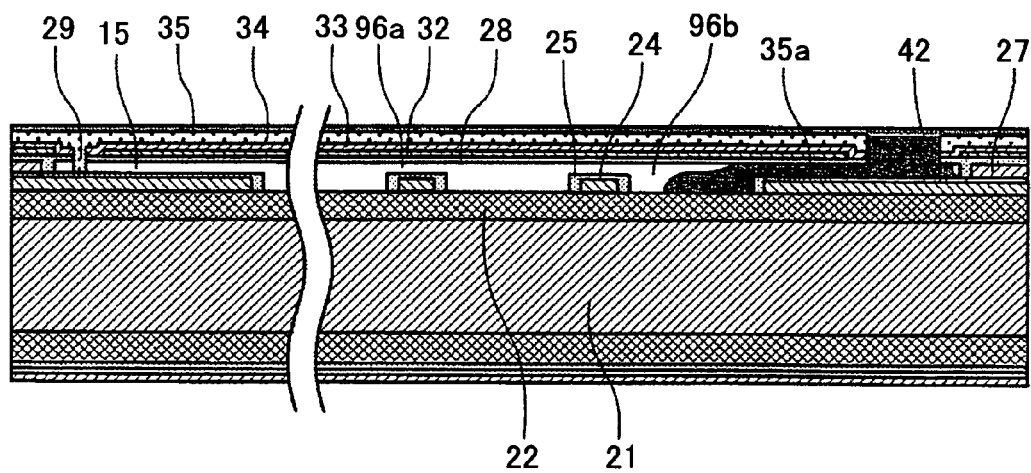
FIG. 37 is a cross-sectional diagram showing a cross section of the actuator substrate portion of FIG. 36 cut across line X10-X10.

In the following, an actuator substrate according to an eighth embodiment of the present invention is described with reference to FIGS. 36 and 37. FIG. 36 is a plan view of an atmosphere connecting part of the actuator substrate according to the present embodiment, and FIG. 37 is a cross-sectional view of the atmosphere connecting part cut across line X10-X10 of FIG. 36.

According to the present embodiment, one atmosphere connecting hole 42 is formed that is connected to the common connection path 15 via a resistance path 96 including path portions (constricted portions) 96a with a relatively low gap height and a relatively small cross-sectional area and path portions 96b with a relatively high gap height and a relatively large cross-sectional area.

According to the fifth through eighth embodiments as is described above, the sealing agent 35a penetrating from the atmosphere connecting hole 42 may be contained within the resistance path (or wobbled path) 93-96 so that the sealing agent 35a may be prevented from penetrating into the common connection path 15.

In the following, exemplary arrangements of the atmosphere connecting part 16 and the common connection path 15 are described with reference to FIGS. 38 through 41.

Figure 38:
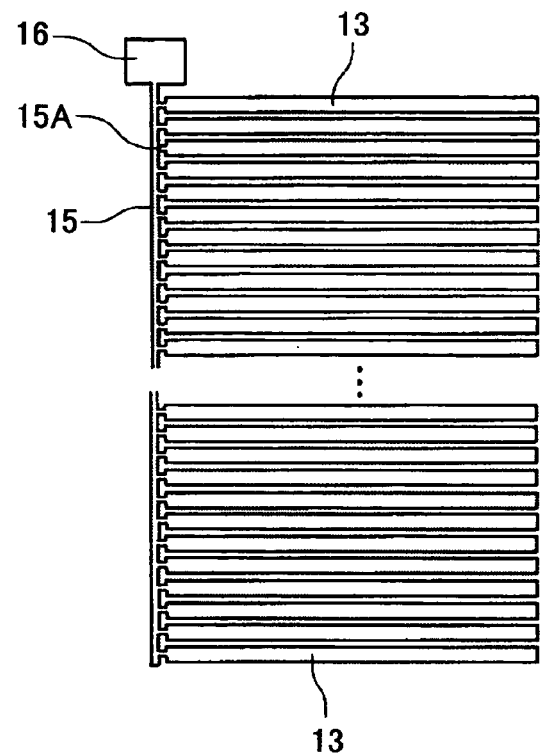
FIG. 38 is a diagram illustrating a first exemplary arrangement of a common connection path and an atmosphere connecting part.
Figure 39:
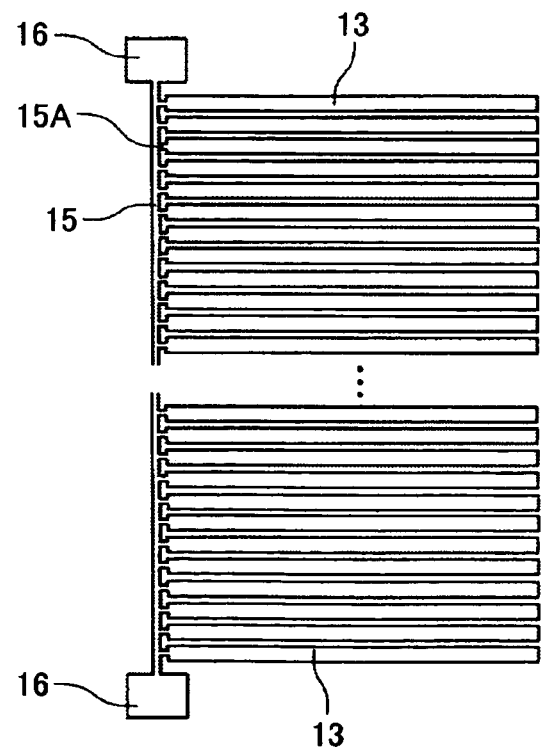
FIG. 39 is a diagram illustrating a second exemplary arrangement of the common connection path and the atmosphere connecting part.

FIG. 38 shows an example in which the ends of the gaps 13 on one side are connected to one common connection path 15 via the individual connection paths 15A, and one end of the common connection path 15 is connected to the atmosphere connecting part 16. FIG. 39 shows an example in which the ends of the gaps 13 on one side are connected to one common connection path 15 via the individual connection paths 15A, and both ends of the common connection path 15 are connected to atmosphere connecting parts 16.

Figure 40:
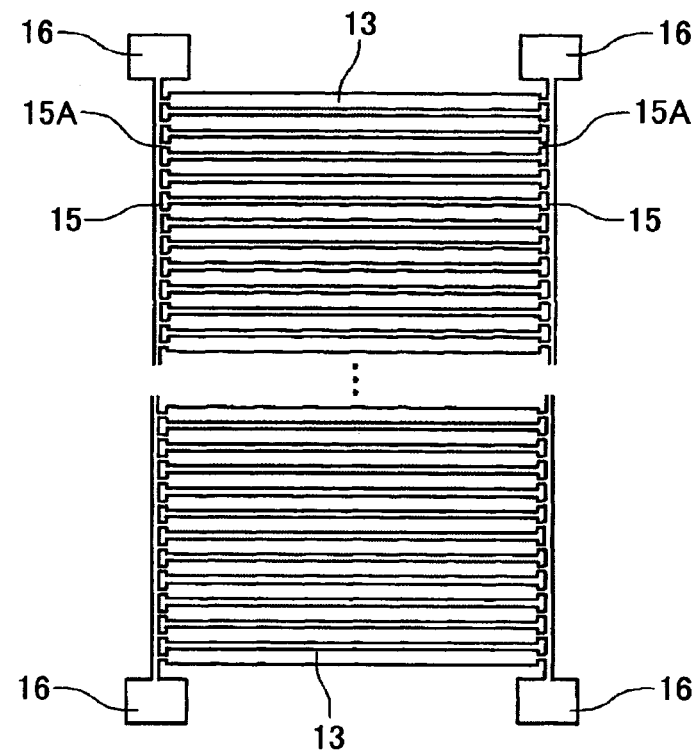
FIG. 40 is a diagram illustrating a third exemplary arrangement of the common connection path and the atmosphere connecting part.
Figure 41:
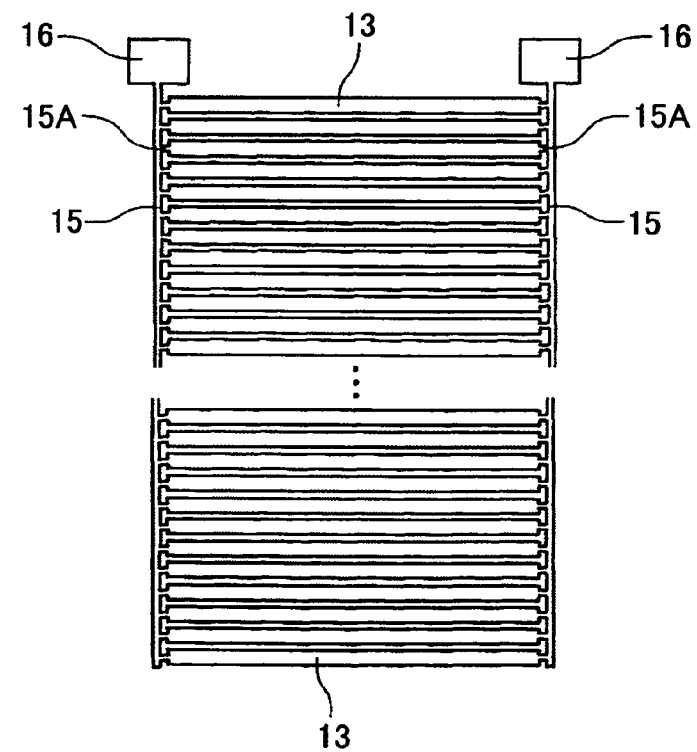
FIG. 41 is a diagram illustrating a fourth exemplary arrangement of the common connection path and the atmosphere connecting part.

FIG. 40 shows an example in which the ends of the gaps 13 on both sides are connected to common connection paths 15 via the individual connection paths 15A, and both ends of each of the common connection paths 15 are connected to atmosphere connecting parts 16. FIG. 41 shows an example in which the ends of the gaps 13 on both sides are connected to common connection paths 15 via the individual connection paths 15A, and one end of each of the common connection paths is connected to the an atmosphere connecting part 16.

Figure 42:
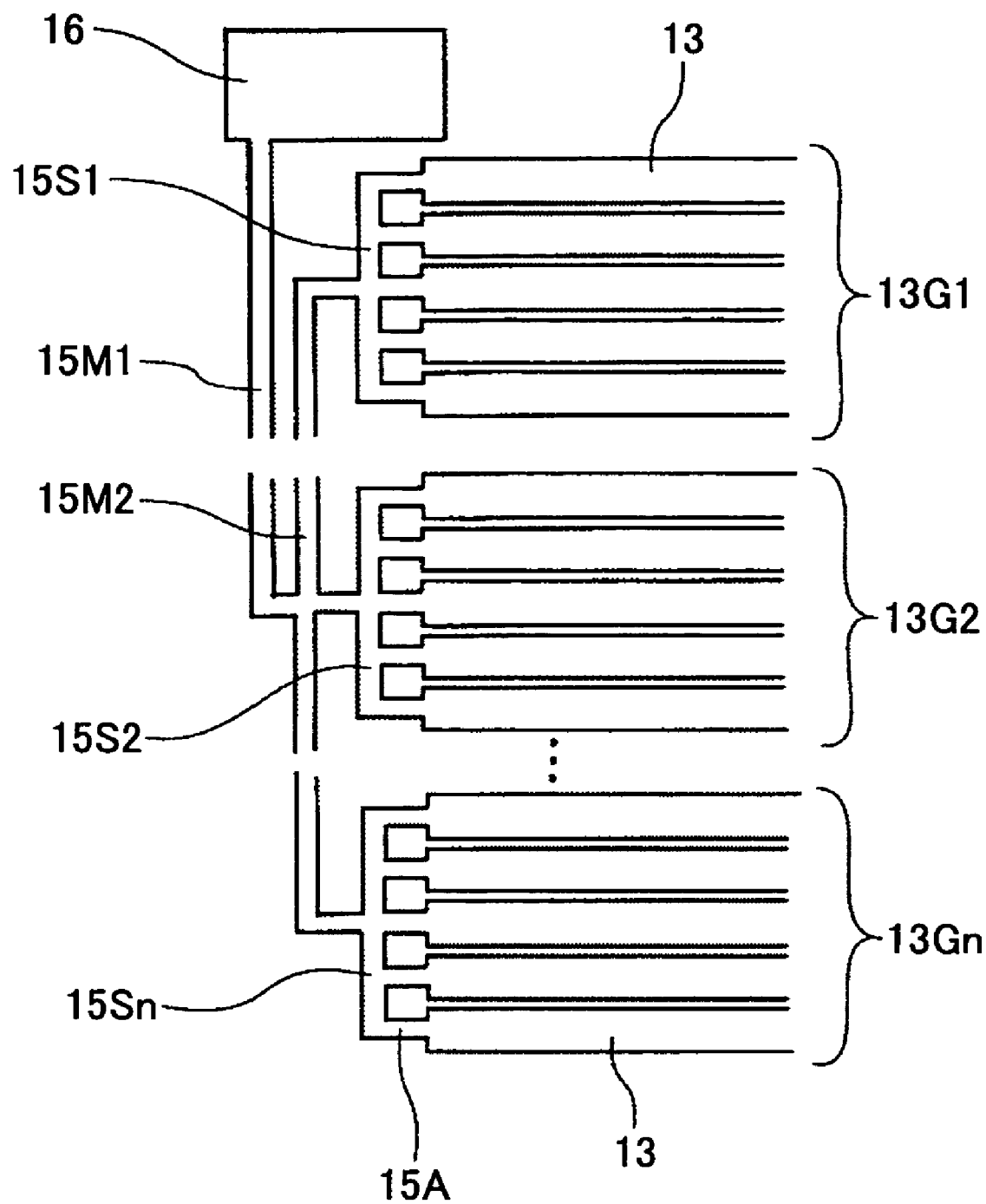
FIG. 42 is a diagram illustrating another modified arrangement of the common connection path and the atmosphere connecting part.

In the following, another modified arrangement of the atmosphere connecting part 16 and the common connection path 15 is described with reference to FIG. 42.

In this example, the gaps 13 are divided into gap groups 13G1-13Gn of a predetermined number, the gap groups 13G1-13Gn are connected to sub common connection paths 15S-15Sn, respectively, the sub common connection paths 15S1-15Sn are connected to a main common connection path 15M2, and the main common connection path 15M2 is connected to the atmosphere connecting part 16 via a main common connection path 15M1.

As can be appreciated, in the present example, the atmosphere connecting part 16 is connected to the gaps 13 via a common connection path 15 that branch out toward the gaps 13. In this way, the gas may be evenly introduced to the gaps 13.

Figure 43:
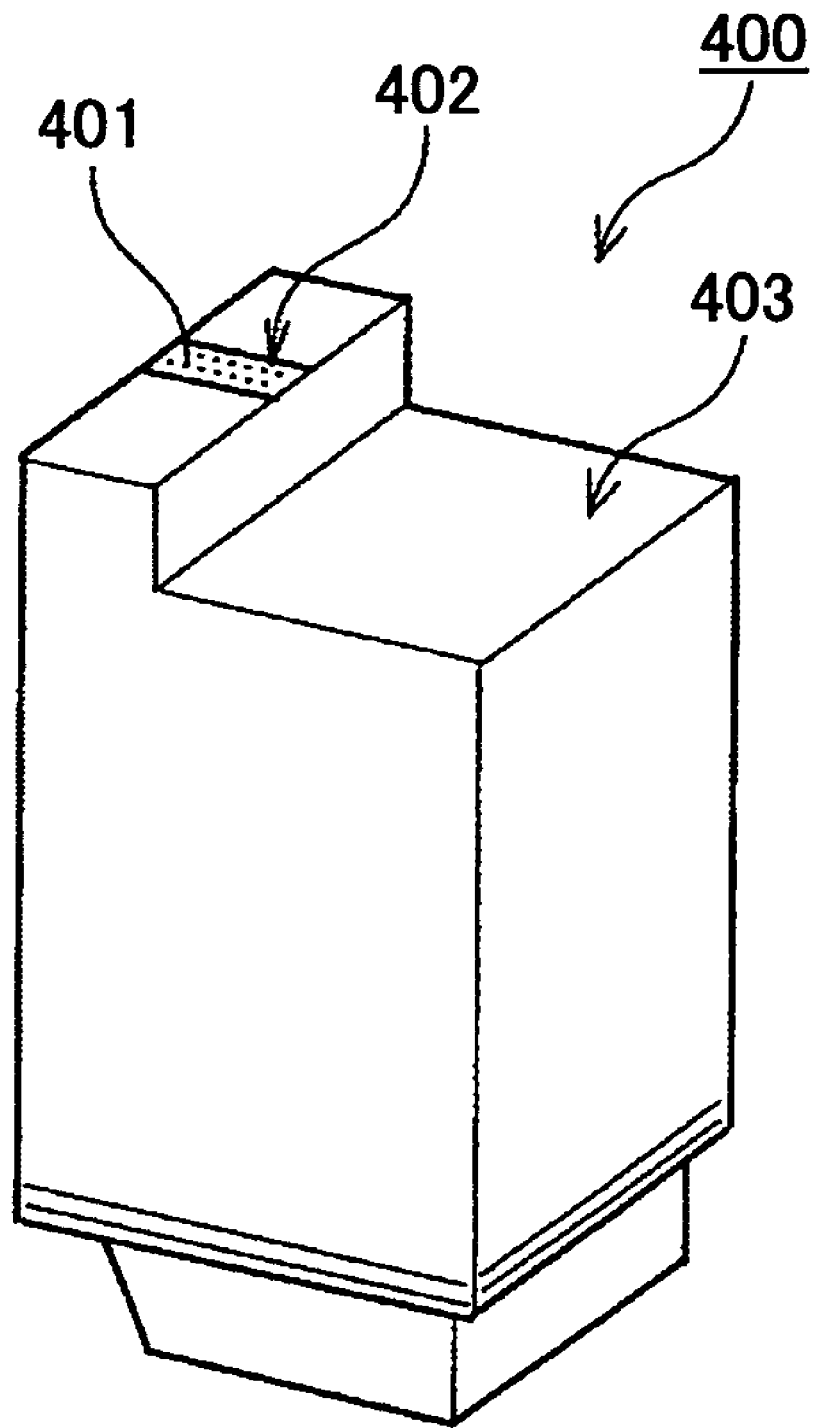
FIG. 43 is a perspective view of a liquid cartridge according to an embodiment of the present invention.

In the following, a configuration of a liquid cartridge according to an embodiment of the present invention is described with reference to FIG. 43.

The illustrated liquid cartridge 400 according to the present embodiment is a structure integrating an inkjet head 402 as a liquid discharge head according to an embodiment of the present invention having nozzle holes 401, for example, and an ink tank (liquid tank) 403 that supplies recording liquid (ink) to the inkjet head 402.

By integrating an ink tank (liquid tank) with a liquid discharge head according to an embodiment of the present invention, a reliable liquid cartridge integrating a liquid discharge head with little variations in the discharge characteristics may be produced at low cost.

Figure 44:
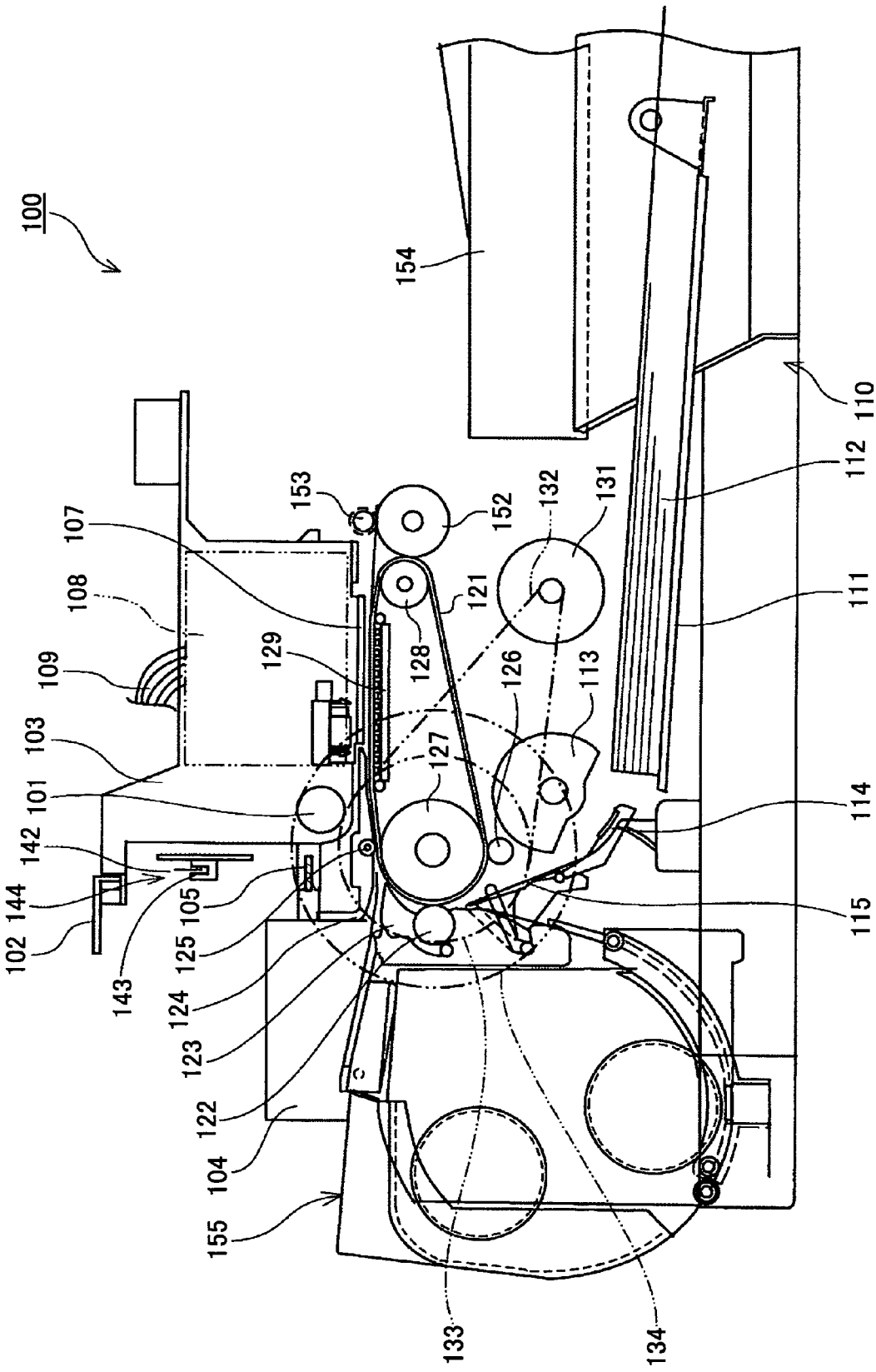
FIG. 44 is a side view of an imaging apparatus according to an embodiment of the present invention.
Figure 45:
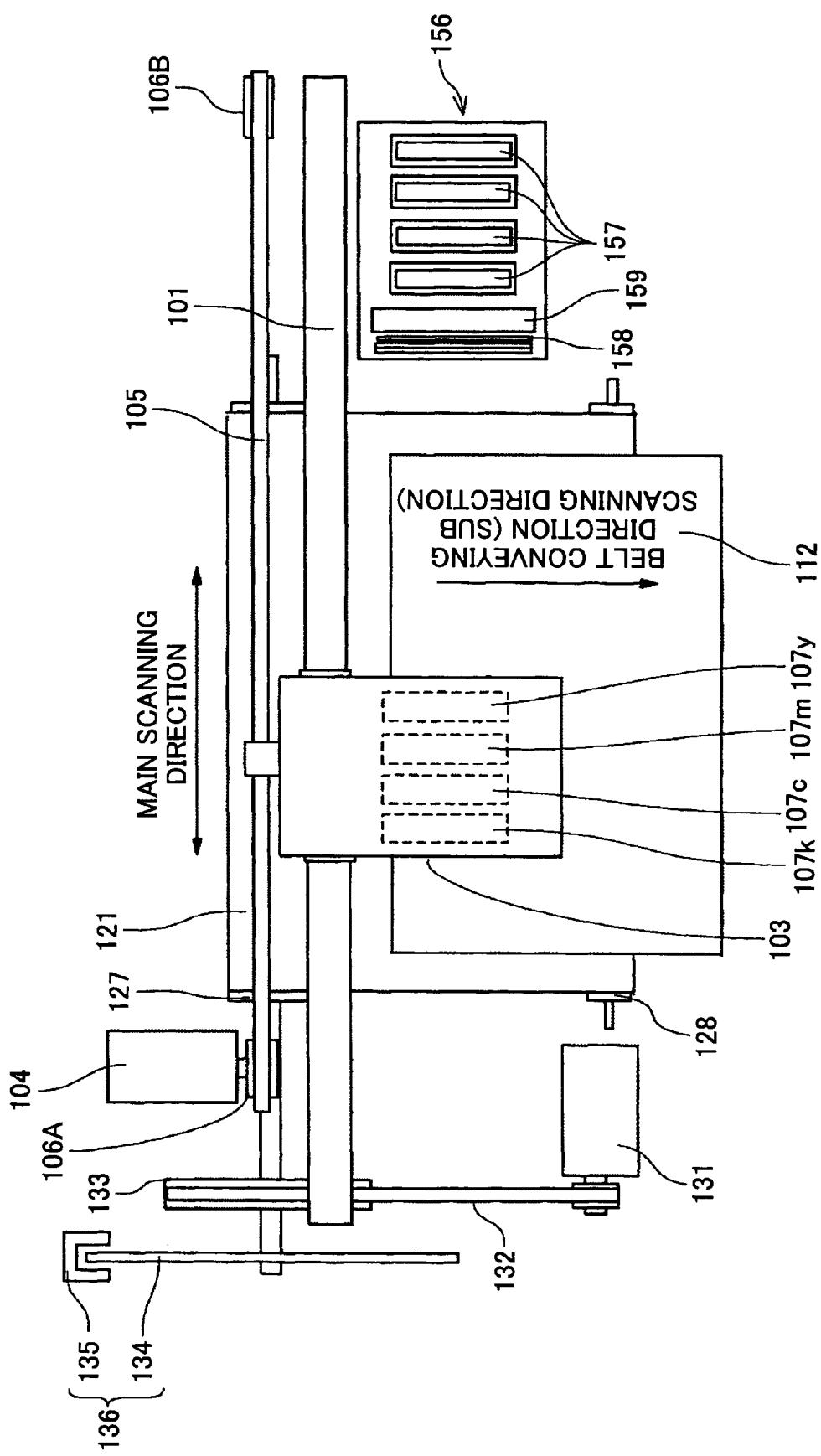
FIG. 45 is a plan view of a portion of the imaging apparatus of FIG. 44.

In the following, an imaging apparatus that employs a liquid discharge head according to an embodiment of the present invention is described with reference to FIGS. 44 and 45. FIG. 44 is an overall side view of the imaging apparatus according to the present embodiment, and FIG. 45 is a partial plan view of the imaging apparatus of the present embodiment.

The illustrated imaging apparatus 100 has a guide rod 101 and a guide rail 102 as guide members that are arranged between right and left side plates (not shown). A carriage 103 is slidably supported by the guide rod 101 and the guide rail 102 so that it may slide in the main scanning directions. This carriage 103 is moved in the main scanning direction (see arrow in FIG. 45) by a main scanning motor 104 via a timing belt 105 that is arranged around a drive pulley 106A and a driven pulley 106B.

The carriage 103 may include a recording head 107 having four independent liquid discharge heads 107k, 107c, 107m, and 107y aligned along the main scanning direction with their liquid discharge directions directed downward, the liquid discharge heads 107k, 107c, 107m, and 107y being configured to discharge liquid droplets (ink droplets) of recording liquid in colors black (K), cyan (C), magenta (M), and yellow (Y), respectively. It is noted that in the illustrated example, independent liquid discharge heads are used for the different colors; however, in alternative examples, one or more heads having plural nozzle rows that discharge droplets of recording liquids of different colors may be used. Also, it is noted that the arrangement order and the number of the colors are not limited to the illustrated example.

The carriage 103 includes sub tanks 108 for supplying inks of the different colors to the recording head 107. The sub tanks 108 are replenished with ink supplied from main tanks (ink cartridge; not shown) via ink supply tubes 109.

Also, the present imaging apparatus includes a paper feeding part for feeding a recording medium (paper sheet) 112 stacked on a paper stacking part (platen) such as a paper feeding cassette 110. The paper feeding part may comprise a paper feeding roller 113 that separates and feeds the paper sheet one by one from the paper stacking part 111 and a separating pad 114 made of a material with a high friction coefficient that is arranged opposite the paper feeding roller 113. It is noted that a force is applied to the separating pad 114 toward the paper feeding roller 113.

Also, the present imaging apparatus includes a conveying part arranged at the lower side of the recording head 107 for conveying the paper sheet 112 fed from the paper feeding part. The conveying part may comprise a conveying belt 121 that attracts the paper sheet 112 thereto through an electrostatic attraction force to convey the paper sheet 112, a counter roller 122 that opposes the conveying belt 121 and holds the paper sheet 112 fed from the paper feeding part via a guide 115 with the conveying belt 121 to convey the paper sheet 121, a conveying guide 123 that diverts the traveling direction of the paper sheet 112 being fed in a substantially upper vertical direction by approximately 90 degrees to guide the paper sheet 112 to travel along the conveying belt 121, a tip pressurized roller 125 having a force applied thereto towards the conveying belt 121 that is arranged at a holding member 124, and a charge roller 126 as charge means for charging the surface of the conveying belt 121.

The conveying belt 121 is a continuous belt that is arranged around a conveying roller 127 and a tension roller 128. The conveying roller 127 is rotated by a sub scanning motor 131 via a timing belt 132 and a timing roller 133 so that the conveying belt 121 rotates in the belt conveying direction (sub scanning direction) as is shown in FIG. 45. It is noted that a guide member 129 is arranged opposite a portion of the rear face of the conveying belt 121 that corresponds to an image forming area where an image is to be formed by the recording head 107.

Also, as is shown in FIG. 45, a slit circular disk 134 is attached to the shaft of the conveying roller 127, and a sensor 135 that detects the slit of the slit circular disk 134 is arranged at the edge of the slit circular disk 134. The slit circular disk 134 and the sensor 135 make up an encoder 136.

The charge roller 126 comes into contact with the surface of the conveying belt 121 and is driven to rotate in response to the rotation of the conveying belt 127. A force of 2.5 N as a pressurizing force is applied to each end of the shaft of the charge roller 126.

As is shown in FIG. 44, an encoder scale 142 having slits is arranged in front of the carriage 103, and an encoder sensor 143 as a transparent photo sensor that detects the slit of the encoder scale 142 is arranged at the front face side of the carriage 103. The encoder scale 142 and the encoder sensor 143 make up an encoder 144 for detecting the main scanning direction position of the carriage 103.

Also, the imaging apparatus 100 includes a paper delivery part for discharging the paper sheet 112 having an image recorded thereon by the recording head 107. The paper delivery part includes a separating part for separating the paper sheet 112 from the conveying belt 121, a paper delivery roller 152, a paper delivery rolling piece 153, and a paper delivery tray 154 that stocks the discharged paper sheets 112.

It is noted that a dual side printing paper feeding unit 155 is detachably arranged at the opposite side of the paper delivery part. The dual side printing paper feeding unit 155 receives the paper sheet 112 that is introduced thereto by reverse direction rotation of the conveying belt 121, turns the paper sheet over to the reverse side, and re-introduces the paper sheet 112 between the counter roller 122 and the conveying belt 121.

As is shown in FIG. 45, a maintenance/restoration mechanism 156 for maintaining and restoring the nozzles of the recording head 107 is arranged at a non-printing area on one side of the scanning direction of the carriage 103.

The maintenance/restoration mechanism 156 includes caps 157 for covering the surfaces of the nozzles of the recording head 107, a wiper blade 158 as a blade member for wiping the nozzle surfaces, an idle discharged liquid receiver 159 for receiving liquid droplets that are discharged during idle discharge that is unrelated to recording for discharging recording liquid that has become viscous, for example.

In the imaging apparatus 100 as is described above, a paper sheet 112 is fed from the paper feeding part one sheet at a time, and the paper sheet 112 being fed in a substantially upper vertical direction is guided by the guide 115 to be introduced between the conveying belt 121 and the counter roller 122. Further, the paper sheet 112 is guided by the conveying guide 123 and is pressed to the conveying belt 121 by the tip pressurizing roller 125 so that its traveling direction is diverted by approximately 90 degrees.

In this case, an alternating voltage that alternates between a positive output and a negative output is applied to the charge roller 126 from an AC bias supply unit (high voltage power source) by a control circuit, and the conveying belt 121 is charged by the alternating charge voltage pattern. That is, the conveying belt 121 is alternatingly charged by positive and negative voltages at predetermined width intervals with respect to the sub scanning direction corresponding to the rotating direction of the conveying belt 121. As a result, when the paper sheet 112 is fed and placed on the conveying belt 121 that is alternatingly charged by the positive and negative voltages, the paper sheet 112 is attracted to the conveying belt by electrostatic force, and the paper sheet 112 is conveyed in the sub scanning direction by the rotational movement of the conveying belt 121.

Then, ink droplets may be discharged from the recording head 107 to record one line image on the paper sheet 112 that is stopped by driving the recording head 107 according to image signals while moving the carriage 103 forward and backward after which the paper sheet 112 is conveyed a predetermined amount to record the next line image. The recording operations may be ended when a recording end signal or a signal indicating that the latter end of the paper sheet 112 has reached the recording area is received after which the paper sheet may be delivered to the delivery tray 154.

In the case of performing dual side printing, when image recording on the surface (first recording face) of the paper sheet 112 is completed, the conveying belt 121 is rotated in the reverse direction so that the paper sheet 112 with an image recorded on one side is sent into the dual side paper feeding unit 155. In the dual side printing unit 155, the paper sheet 112 is turned over to the other side (so that the rear face becomes the printing face) to be fed between the counter roller 122 and the conveying belt 121 once again. Then, timing control is performed to convey the paper sheet 112 onto the conveying belt 121 and image recording is performed on the rear face of the paper sheet 121 after which the paper sheet 112 is delivered to the paper delivery tray 154.

In a print (recording) standby mode, the carriage 103 is moved toward the maintenance/restoration mechanism 155, and the nozzle surfaces of the recording head 107 are covered by the caps 157 to maintain the dampness of the nozzles and prevent discharge defects due to dried ink. Also, recovery operations are performed that involve extracting the recording liquid from the nozzles through suction while the nozzle faces are covered by the caps 157 to discharge viscous recording liquid and air bubbles, for example (referred to as "nozzle suction" or "head suction" hereinafter). Further, wiping operations by the wiper blade 158 are performed in order to clean and remove the recording liquid adhered to the nozzle surfaces of the recording head 107 as a result of the restoration operations. Also, it is noted that idle discharge operations for discharging ink that are unrelated to recording operations may be performed before or in the middle of the recording operations. In this way, stable discharge performance of the recording head 107 may be maintained.

It is noted that the imaging apparatus 100 according to the present embodiment includes a liquid discharge head or a liquid cartridge according to an embodiment of the present invention so that it may perform high quality image recording.

Figure 46:
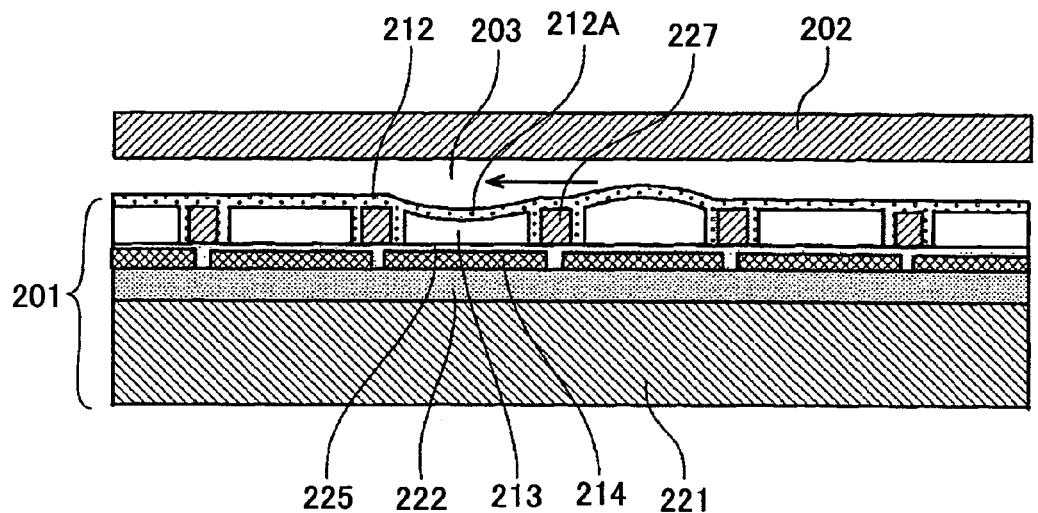
FIG. 46 is a schematic diagram showing a micro pump according to an embodiment of the present invention.

In the following, a micro pump as a micro device including an electrostatic actuator according to an embodiment of the present invention is described with reference to FIG. 46. FIG. 46 is a schematic diagram of a portion of the micro pump according to the present embodiment.

The illustrated micro pump includes an actuator substrate 201 as an electrostatic actuator according to an embodiment of the present invention and a flow path substrate 202. The flow path substrate 202 includes a flow path 203 for enabling the flow of fluid. The actuator substrate 201 includes an oscillating plate 212 and individual electrodes 214 that are arranged opposite deformable areas 12A of the oscillating plate 212 via gaps 213 that are formed through sacrificial layer etching.

The actuator substrate 201 may have a configuration similar to that of the actuator substrate 1 as is described above. Specifically, the actuator substrate 201 is fabricated by depositing an insulating film 222 on a silicon substrate 221, forming the individual electrodes 214 on the insulating film 222, covering the individual electrodes 214 with an insulating film 225, forming a sacrificial layer 227 on the insulating film 225, depositing a film that makes up a part of the oscillating plate 212, and performing sacrificial etching to create the gaps 213. It is noted that a common connection path (not shown) that interconnects the gaps 213 is also created.

In the following, the principle operations of the micro pump are described. As is described in relation to the liquid discharge head according to an embodiment of the present invention, by selectively applying a pulse potential to the individual electrodes 214, an electrostatic attraction force is generated between the individual electrodes 214 and the oscillating plate 212 so that the deformable areas 212A of the oscillating plate 212 deforms toward the individual electrodes 214. In this case, by successively driving the deformable areas 212A of the oscillating plate 212 starting from the right side of FIG. 46, the fluid within the fluid path 203 may be forced to flow in the direction indicated by the arrow shown in FIG. 46 so that the fluid may be transferred.

As can be appreciated from the above descriptions, by employing an electrostatic actuator according to an embodiment of the present invention, a small micro pump with low power consumption that is capable of stable liquid transfer may be obtained. It is noted that in one preferred embodiment, one or more valves (e.g., check valves) may be arranged between the deformable areas 212A in order to improve transfer efficiency, for example.

Figure 47:
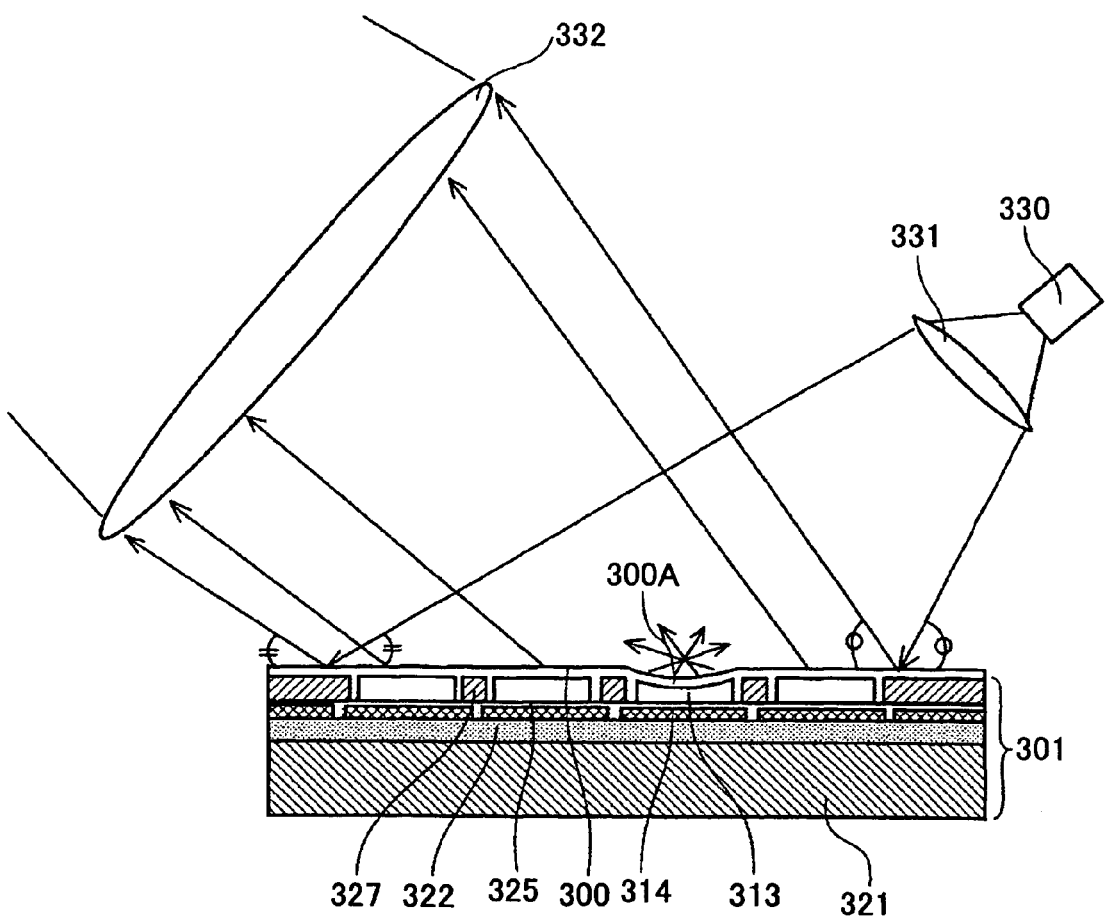
FIG. 47 is a schematic diagram showing an optical device according to an embodiment of the present invention.

In the following, an optical device that includes an electrostatic actuator according to an embodiment of the present invention is described with reference to FIG. 47. FIG. 47 shows an overall configuration of the optical device of the present embodiment.

The illustrated optical device includes an actuator substrate 301 that has a mirror 300 as a deformable oscillating plate with a surface that reflects light. It is noted that a dielectric multilayer film or a metal film is preferably arranged on the surface of the mirror 300 (resin film surface) to increase the reflection rate of the mirror surface.

The actuator substrate 301 includes the deformable mirror 300 (corresponding to an oscillating plate of the head) that is arranged on a base substrate 321 with an insulating film 322 formed thereon, and electrodes 314 that are arranged opposite the deformable areas 300A of the mirror 300 via gaps 313. Also, an insulating film 325 and a sacrificial layer 327 are arranged on the electrodes 314, and the gaps 313 are created by etching the sacrificial layer 327. It is noted that the configuration of the present optical device is generally identical to that of the electrostatic actuator according to an embodiment of the present invention as is described above other than the feature that the oscillating plate of the present optical device has a mirror surface, and therefore detailed descriptions thereof are omitted.

In the following, principle operations of the optical device are described. As with the electrostatic actuator according to an embodiment of the present invention as is described above, by selectively applying a pulse potential to the electrodes 314, an electrostatic attraction force is created between the corresponding electrode 314 and the deformable area 300A of the mirror 300 arranged on the opposite side so that the deformable area 300A of the mirror 300 deforms into a recessed shape to become a convex mirror. Therefore, in a case where light from a light source 330 is irradiated on the mirror 300 via a lens 331, if the mirror is not driven, the light is reflected by the mirror 300 at a reflection angle that is substantially equal to the incident angel of the light. On the other hand, if the mirror 300 is driven, the driven deformable area 300A becomes a convex mirror so that the light reflected therefrom becomes divergent. In this way, a light modulation device may be realized.

As can be appreciated from the above descriptions, by employing an electrostatic actuator according to an embodiment of the present invention, a small optical device with a low power consumption rate may be obtained.

Figure 48:
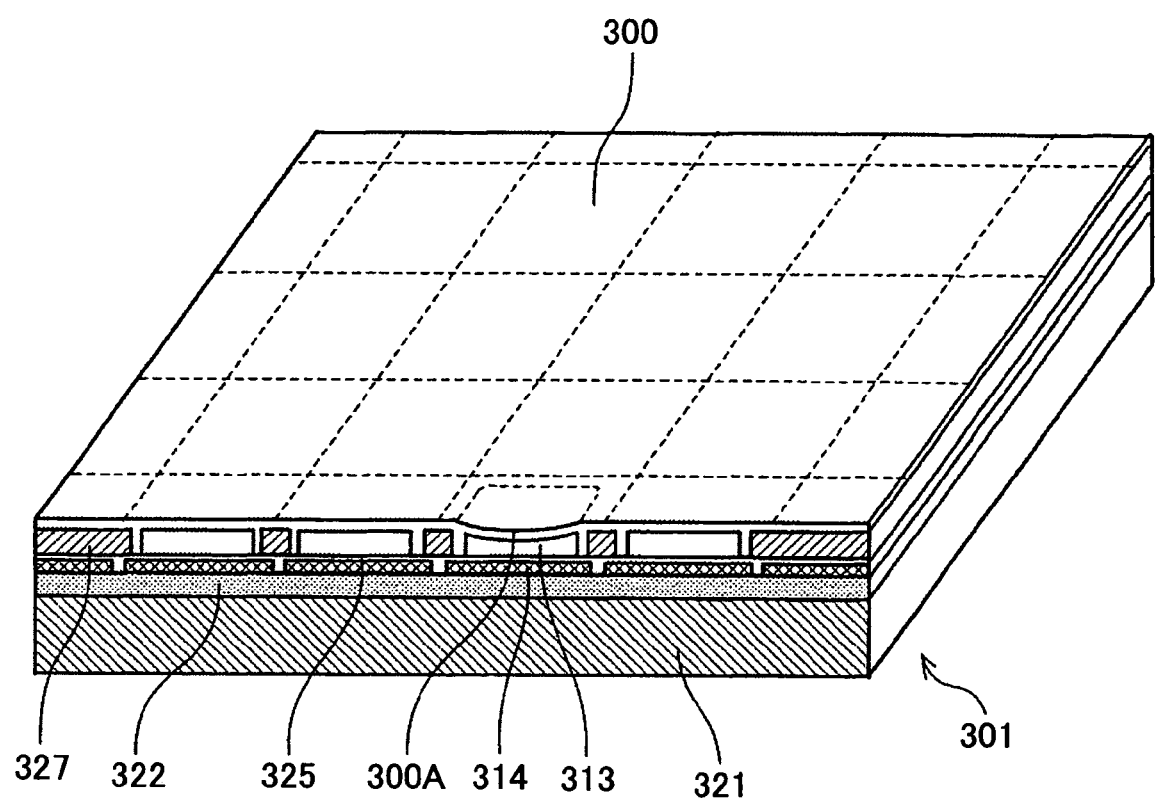
FIG. 48 is a perspective view of an exemplary application of the optical device of FIG. 47.

In the following an exemplary application of the optical device is described with reference to FIG. 48. In this example, optical devices are arranged into a two-dimensional pattern, and the deformable areas 300A of the mirrors 300 of the optical devices are configured to be independently driven. It is noted that although the optical devices are arranged into a 4×4 pattern in the illustrated example, other examples are possible in which more devices are arranged.

As is described in relation to FIG. 47, light from the light source 330 that is irradiated on the mirror 300 via the lens 331 on an area where the mirror 300 is not driven is reflected and incident on a projection lens 332. On the other hand, light irradiated on a deformable area 300A of the mirror 300 that is deformed to become a convex mirror by applying a voltage to a corresponding electrode 314 is diverged so that most of the light is not incident on the projection lens 332. The light incident on the projection lens 332 may be projected on a screen (not shown) so that an image may be displayed on the screen.

It is noted that in the above descriptions, examples are described in which an inkjet head is used as the liquid discharge head; however, the present invention is not limited to applications of the inkjet head. For example, the present invention may be applied to a liquid discharge head that discharges droplets of liquid resist, a liquid discharge head that discharges droplets of DNA samples, and other types of liquid discharge heads. Also, an electrostatic actuator and a manufacturing method thereof according to embodiments of the present invention is not limited to being applied to a micro pump or an optical device as is described above, and may also be applied to a multi-optical lens actuator (optical switch), a micro flow meter, or a pressure sensor, for example.

Although the present invention is shown and described with respect to certain preferred embodiments, it is obvious that equivalents and modifications will occur to others skilled in the art upon reading and understanding the specification. The present invention includes all such equivalents and modifications, and is limited only by the scope of the claims.

The present application is based on and claims the benefit of the earlier filing date of Japanese Patent Application No. 2005-266265 filed on Sep. 14, 2005, the entire contents of which are hereby incorporated by reference.

What is claimed is:

1. An electrostatic actuator, comprising:
   a deformable oscillating plate that is deformed by an electrostatic force;
   an electrode that is arranged opposite the oscillating plate via a gap formed by sacrificial layer etching;
   a connection path that is connected to the gap;
   an atmosphere connecting hole that connects the connection path to the exterior; and
   a resistance path arranged between the atmosphere connecting hole and the connection path, the resistance path being configured to resist penetration of a sealing agent for sealing the atmosphere connecting hole into the connection path.

2. The electrostatic actuator as claimed in claim 1, wherein
   the connection path includes a common connection path that is connected to a plurality of the gaps.

3. The electrostatic actuator as claimed in claim 1, further comprising:
   a plurality of the atmosphere connecting holes.

4. The electrostatic actuator as claimed in claim 1, wherein
   another sealing agent that is different from the sealing agent for sealing the atmosphere connecting hole is used to seal a sacrificial layer removal hole through which the sacrificial layer etching is performed.

5. The electrostatic actuator as claimed in claim 1, wherein
   the gap, the connection path, and the resistance path are created by removing a common sacrificial layer.

6. The electrostatic actuator as claimed in claim 1, wherein
   the resistance path is a wobbled path.

7. The electrostatic actuator as claimed in claim 1, wherein
   the resistance path includes a high level portion and a low level portion.

8. The electrostatic actuator as claimed in claim 1, wherein
   the resistance path includes a portion with a relatively small cross-sectional area and a portion with a relatively large cross-sectional area.

9. A liquid discharge head comprising:
   a nozzle from which liquid is discharged; and
   an electrostatic actuator that induces discharge of the liquid from the nozzle, the electrostatic actuator including
   a deformable oscillating plate that is deformed by an electrostatic force;
   an electrode that is arranged opposite the oscillating plate via a gap formed by sacrificial layer etching;
   a connection path that is connected to the gap;
   an atmosphere connecting hole that connects the connection path to the exterior; and
   a resistance path arranged between the atmosphere connecting hole and the connection path, the resistance path being configured to resist penetration of a sealing agent for sealing the atmosphere connecting hole into the connection path.

10. An imaging apparatus comprising:
    a liquid discharge head for discharging liquid that includes an electrostatic actuator including
    a deformable oscillating plate that is deformed by an electrostatic force;
    an electrode that is arranged opposite the oscillating plate via a gap formed by sacrificial layer etching;
    a connection path that is connected to the gap;
    an atmosphere connecting hole that connects the connection path to the exterior; and
    a resistance path arranged between the atmosphere connecting hole and the connection path, the resistance path being configured to resist penetration of a sealing agent for sealing the atmosphere connecting hole into the connection path.

* * * * *